United States Patent
Saggar et al.

(10) Patent No.: US 11,653,384 B2
(45) Date of Patent: May 16, 2023

(54) TECHNIQUES FOR INDICATING COVERAGE ENHANCEMENT FOR RANDOM ACCESS PROCEDURES IN WIRELESS COMMUNICATIONS SYSTEMS

(71) Applicant: QUALCOMM Incorporated, San Diego, CA (US)

(72) Inventors: Hemant Saggar, Irvine, CA (US); Mahmoud Taherzadeh Boroujeni, San Diego, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/216,480

(22) Filed: Mar. 29, 2021

(65) Prior Publication Data
US 2022/0312474 A1 Sep. 29, 2022

(51) Int. Cl.
*H04W 4/00* (2018.01)
*H04W 74/00* (2009.01)
(Continued)

(52) U.S. Cl.
CPC ....... *H04W 74/006* (2013.01); *H04W 72/042* (2013.01); *H04W 74/0833* (2013.01); *H04W 76/27* (2018.02)

(58) Field of Classification Search
CPC . H04W 74/006; H04W 76/27; H04W 72/042; H04W 74/0833
See application file for complete search history.

(56) References Cited

U.S. PATENT DOCUMENTS

2015/0124746 A1 5/2015 Wu et al.
2016/0198497 A1* 7/2016 Yu ..................... H04W 72/0446
370/330
(Continued)

FOREIGN PATENT DOCUMENTS

EP 3100536 A1 12/2016
EP 3411976 A1 12/2018

OTHER PUBLICATIONS

Huawei, et al., "Discussion on the Potential Coverage Enhancement Solutions for Other Channels", 3GPP Draft, 3GPP TSG RAN WG1 Meeting #102-e, R1-2005274, 3rd Generation Partnership Project (3GPP), Mobile Competence Centre, 650, Route Des Lucioles, F-06921 Sophia-Antipolis Cedex, France, vol. RAN WG1, No. E-meeting, Aug. 17, 2020-Aug. 28, 2020, Aug. 8, 2020 (Aug. 8, 2020), XP051917322, 2 Pages, Retrieved from the Internet: URL: https://ftp.3gpp.org/tsg_ran/WG1_RL1/TSGR1_102-e/Docs/R1-2005274.zip R1-2005274.docx [Retrieved on Aug. 8, 2020], The Whole Document.

(Continued)

*Primary Examiner* — Siren Wei
(74) *Attorney, Agent, or Firm* — Dalei Dong; Holland & Hart LLP

(57) ABSTRACT

Methods, systems, and devices for wireless communication are described. Generally, the described techniques provide for a base station to determine whether to perform coverage enhancement for a random access procedure and to transmit an indication to a user equipment (UE) accordingly. For example, a base station may transmit an indication of whether coverage enhancement is associated with a second random access message (e.g., a random access Message 4 (Msg4)) using a first random access message (e.g., a random access Message 2 (Msg2)). The base station may transmit, and the UE receive, the second random access message accordingly. Implementing aspects of the present disclosure (Continued)

may enable coverage enhancement for random access procedures in wireless communications systems.

28 Claims, 17 Drawing Sheets

(51) Int. Cl.
*H04W 76/27* (2018.01)
*H04W 72/04* (2023.01)
*H04W 74/08* (2009.01)

(56) References Cited

U.S. PATENT DOCUMENTS

| | | | |
|---|---|---|---|
| 2016/0242212 A1* | 8/2016 | Wong | H04W 74/0833 |
| 2016/0270038 A1 | 9/2016 | Papasakellariou | |
| 2016/0309507 A1* | 10/2016 | Park | H04W 4/70 |
| 2016/0353440 A1* | 12/2016 | Lee | H04W 72/042 |
| 2017/0055250 A1* | 2/2017 | Lim | H04L 5/0053 |
| 2017/0099682 A1 | 4/2017 | Priyanto et al. | |
| 2017/0280481 A1* | 9/2017 | Stern-Berkowitz | H04L 1/1854 |
| 2017/0303317 A1* | 10/2017 | Islam | H04W 72/12 |
| 2018/0249508 A1* | 8/2018 | Gao | H04W 74/006 |
| 2018/0269962 A1* | 9/2018 | Liu | H01Q 1/246 |
| 2020/0187237 A1 | 6/2020 | Su et al. | |
| 2020/0252962 A1 | 8/2020 | Vajapeyam et al. | |
| 2021/0037573 A1 | 2/2021 | Ly et al. | |
| 2021/0051707 A1 | 2/2021 | Rastegardoost et al. | |
| 2022/0046726 A1 | 2/2022 | Taherzadeh Boroujeni et al. | |
| 2022/0078848 A1 | 3/2022 | Hu et al. | |
| 2022/0312476 A1 | 9/2022 | Saggar et al. | |

OTHER PUBLICATIONS

Huawei, et al., "Lower UE Power Class for Rel-15 MTC", 3GPP TSG RAN WG2 Meeting #101, R2-1802190 (Resubmission of R2-1713121), 3rd Generation Partnership Project (3GPP), Mobile Competence Centre, 650, Route Des Lucioles, F-06921 Sophia, vol. RAN WG2, No. Athens, Greece, Feb. 26, 2018-Mar. 2, 2018, Feb. 15, 2018, XP051399846, URL: http://www.3gpp.org/ftp/tsg%5Fran/WG2%5FRL2/TSGR2%5F101/Docs/.
International Search Report and Written Opinion—PCT/US2022/018461—ISA/EPO—dated Jun. 29, 2022.

* cited by examiner

TECHNIQUES FOR INDICATING COVERAGE ENHANCEMENT FOR RANDOM ACCESS PROCEDURES IN WIRELESS COMMUNICATIONS SYSTEMS

FIELD OF DISCLOSURE

The following relates, for example, to wireless communication, including techniques for indicating coverage enhancement for random access procedures in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support devices performing random access procedures to establish connections. It may be beneficial to provide techniques for coverage enhancement for random access procedures.

SUMMARY

The described techniques relate to improved methods, systems, devices, and apparatuses that support techniques for indicating coverage enhancement for random access procedures in wireless communications systems. Generally, the described techniques provide for a base station to determine whether to perform coverage enhancement for a random access procedure and to transmit an indication to a user equipment (UE) accordingly. For example, a base station may transmit an indication of whether coverage enhancement is associated with a second random access message (e.g., a random access Message 4 (Msg4)) using a first random access message (e.g., a random access Message 2 (Msg2)). In some implementations, the base station may also transmit an indication of a type of coverage enhancement associated with the second random access message using the first random access message. The base station may transmit, and the UE receive, the second random access message accordingly. Implementing aspects of the present disclosure may enable coverage enhancement for random access procedures in wireless communications systems.

A method for wireless communication at a user equipment (UE) is described. The method may include receiving, from a base station, a first random access message including an indication as to whether a coverage enhancement is associated with a second random access message, the indication based on a condition of a channel used to receive the second random access message from the base station failing to satisfy a threshold and receiving, from the base station, the second random access message based on receiving the indication.

An apparatus for wireless communication at a UE is described. The apparatus may include a processor, memory coupled with the processor, and instructions stored in the memory. The instructions may be executable by the processor to cause the apparatus to receive, from a base station, a first random access message including an indication as to whether a coverage enhancement is associated with a second random access message, the indication based on a condition of a channel used to receive the second random access message from the base station failing to satisfy a threshold and receive, from the base station, the second random access message based on receiving the indication.

Another apparatus for wireless communication at a UE is described. The apparatus may include means for receiving, from a base station, a first random access message including an indication as to whether a coverage enhancement is associated with a second random access message, the indication based on a condition of a channel used to receive the second random access message from the base station failing to satisfy a threshold and means for receiving, from the base station, the second random access message based on receiving the indication.

A non-transitory computer-readable medium storing code for wireless communication at a UE is described. The code may include instructions executable by a processor to receive, from a base station, a first random access message including an indication as to whether a coverage enhancement is associated with a second random access message, the indication based on a condition of a channel used to receive the second random access message from the base station failing to satisfy a threshold and receive, from the base station, the second random access message based on receiving the indication.

In some examples of the method, apparatuses, and non-transitory computer-readable medium described herein, receiving the first random access message may include operations, features, means, or instructions for receiving an indication of whether the coverage enhancement may be associated with the second random access message in a physical downlink shared channel payload associated with the first random access message.

In some examples of the method, apparatuses, and non-transitory computer-readable medium described herein, receiving the first random access message may include operations, features, means, or instructions for receiving an indication of whether the coverage enhancement may be associated with the second random access message in downlink control information associated with the first random access message.

In some examples of the method, apparatuses, and non-transitory computer-readable medium described herein, receiving the first random access message may include operations, features, means, or instructions for receiving the first random access message using a temporary cell radio network temporary identifier, where the first random access message implicitly indicates whether the coverage enhancement may be associated with the second random access message based on the temporary cell radio network temporary identifier.

In some examples of the method, apparatuses, and non-transitory computer-readable medium described herein, receiving the first random access message may include operations, features, means, or instructions for receiving an indication including one bit configured for indicating whether the coverage enhancement may be associated with a physical downlink control channel payload and a physical downlink shared channel payload associated with the second random access message, where the first random access message includes the indication.

In some examples of the method, apparatuses, and non-transitory computer-readable medium described herein, receiving the first random access message may include operations, features, means, or instructions for receiving an indication including at least two bits configured for independently indicating whether the coverage enhancement may be associated with a physical downlink control channel payload or a physical downlink shared channel payload or both associated with the second random access message, where the first random access message includes the indication.

In some examples of the method, apparatuses, and non-transitory computer-readable medium described herein, receiving the first random access message may include operations, features, means, or instructions for receiving an indication of a type of the coverage enhancement in a physical downlink shared channel payload associated with the first random access message, where the first random access message includes the indication.

In some examples of the method, apparatuses, and non-transitory computer-readable medium described herein, receiving the first random access message may include operations, features, means, or instructions for receiving an indication of a type of the coverage enhancement in a downlink control information payload associated with the first random access message, where the first random access message includes the indication.

In some examples of the method, apparatuses, and non-transitory computer-readable medium described herein, receiving the first random access message may include operations, features, means, or instructions for receiving a downlink control information payload associated with the first random access message, where the first random access message implicitly indicates a type of the coverage enhancement associated with the second random access message based on a location of the downlink control information payload in the first random access message.

In some examples of the method, apparatuses, and non-transitory computer-readable medium described herein, receiving the first random access message may include operations, features, means, or instructions for receiving the first random access message using a temporary cell radio network temporary identifier, where the first random access message implicitly indicates a type of the coverage enhancement associated with the second random access message based on the temporary cell radio network temporary identifier.

A method for wireless communication at a base station is described. The method may include transmitting, to a UE, a first random access message including an indication as to whether a coverage enhancement is associated with a second random access message, the indication based on a condition of a channel used to transmit the second random access message from the base station to the UE failing to satisfy a threshold and transmitting, to the UE, the second random access message based on transmitting the indication.

An apparatus for wireless communication at a base station is described. The apparatus may include a processor, memory coupled with the processor, and instructions stored in the memory. The instructions may be executable by the processor to cause the apparatus to transmit, to a UE, a first random access message including an indication as to whether a coverage enhancement is associated with a second random access message, the indication based on a condition of a channel used to transmit the second random access message from the base station to the UE failing to satisfy a threshold and transmit, to the UE, the second random access message based on transmitting the indication.

Another apparatus for wireless communication at a base station is described. The apparatus may include means for transmitting, to a UE, a first random access message including an indication as to whether a coverage enhancement is associated with a second random access message, the indication based on a condition of a channel used to transmit the second random access message from the base station to the UE failing to satisfy a threshold and means for transmitting, to the UE, the second random access message based on transmitting the indication.

A non-transitory computer-readable medium storing code for wireless communication at a base station is described. The code may include instructions executable by a processor to transmit, to a UE, a first random access message including an indication as to whether a coverage enhancement is associated with a second random access message, the indication based on a condition of a channel used to transmit the second random access message from the base station to the UE failing to satisfy a threshold and transmit, to the UE, the second random access message based on transmitting the indication.

In some examples of the method, apparatuses, and non-transitory computer-readable medium described herein, transmitting the first random access message may include operations, features, means, or instructions for transmitting an indication of whether the coverage enhancement may be associated with the second random access message in a physical downlink shared channel payload associated with the first random access message.

In some examples of the method, apparatuses, and non-transitory computer-readable medium described herein, transmitting the first random access message may include operations, features, means, or instructions for transmitting an indication of whether the coverage enhancement may be associated with the second random access message in downlink control information associated with the first random access message.

In some examples of the method, apparatuses, and non-transitory computer-readable medium described herein, transmitting the first random access message may include operations, features, means, or instructions for transmitting the first random access message using a temporary cell radio network temporary identifier, where the first random access message implicitly indicates whether the coverage enhancement may be associated with the second random access message based on the temporary cell radio network temporary identifier.

In some examples of the method, apparatuses, and non-transitory computer-readable medium described herein, transmitting the first random access message may include operations, features, means, or instructions for transmitting an indication including one bit configured for indicating whether the coverage enhancement may be associated with a physical downlink control channel payload and a physical downlink shared channel payload associated with the second random access message, where the first random access message includes the indication.

In some examples of the method, apparatuses, and non-transitory computer-readable medium described herein, transmitting the first random access message may include operations, features, means, or instructions for transmitting an indication including at least two bits configured for independently indicating whether the coverage enhancement may be associated with a physical downlink control channel payload or a physical downlink shared channel payload or both associated with the second random access message, where the first random access message includes the indication.

Some examples of the method, apparatuses, and non-transitory computer-readable medium described herein may further include operations, features, means, or instructions for receiving, from the UE, a random access preamble, where transmitting the first random access message may be in response to receiving the random access preamble.

Some examples of the method, apparatuses, and non-transitory computer-readable medium described herein may further include operations, features, means, or instructions for determining a channel characteristic associated with the channel between the base station and the UE based on receiving the random access preamble, where transmitting the first random access message may be based on the channel characteristic.

In some examples of the method, apparatuses, and non-transitory computer-readable medium described herein, the channel characteristic includes one or more of a reference signal received power or a signal-to-interference-plus-noise-ratio.

In some examples of the method, apparatuses, and non-transitory computer-readable medium described herein, receiving the random access preamble may include operations, features, means, or instructions for receiving, from the UE, a random access preamble requesting the coverage enhancement associated with the second random access message, where transmitting the first random access message may be based on receiving the first random access message.

Some examples of the method, apparatuses, and non-transitory computer-readable medium described herein may further include operations, features, means, or instructions for determining a type of the UE based on receiving the random access preamble, where transmitting the first random access message may be based on the type of the UE.

Some examples of the method, apparatuses, and non-transitory computer-readable medium described herein may further include operations, features, means, or instructions for determining to perform the coverage enhancement associated with the second random access message, where transmitting the first random access message may be based on the determining and transmitting the second random access message according to the coverage enhancement.

Some examples of the method, apparatuses, and non-transitory computer-readable medium described herein may further include operations, features, means, or instructions for determining that the base station may be configured to use a first type of coverage enhancement associated with the second random access message, where transmitting the second random access message may be based on the determining.

In some examples of the method, apparatuses, and non-transitory computer-readable medium described herein, transmitting the first random access message may include operations, features, means, or instructions for transmitting an indication of a type of the coverage enhancement in a physical downlink shared channel payload associated with the first random access message, where the first random access message includes the indication.

In some examples of the method, apparatuses, and non-transitory computer-readable medium described herein, transmitting the first random access message may include operations, features, means, or instructions for transmitting an indication of a type of the coverage enhancement in a downlink control information payload associated with the first random access message, where the first random access message includes the indication.

In some examples of the method, apparatuses, and non-transitory computer-readable medium described herein, transmitting the first random access message may include operations, features, means, or instructions for transmitting a downlink control information payload associated with the first random access message, where the first random access message implicitly indicates a type of the coverage enhancement associated with the second random access message based on a location of the downlink control information payload in the first random access message.

In some examples of the method, apparatuses, and non-transitory computer-readable medium described herein, transmitting the first random access message may include operations, features, means, or instructions for transmitting the first random access message using a temporary cell radio network temporary identifier, where the first random access message implicitly indicates a type of the coverage enhancement associated with the second random access message based on the temporary cell radio network temporary identifier.

Some examples of the method, apparatuses, and non-transitory computer-readable medium described herein may further include operations, features, means, or instructions for determining a first type of the coverage enhancement associated with the second random access message, where transmitting the first random access message includes transmitting an indication of the first type, receiving, from the UE, a third random access message based on transmitting the first random access message, and determining a second type of the coverage enhancement associated with the second random access message based on transmitting the first random access message and receiving the fifth random access message, where transmitting the second random access message may be based on determining the second type.

DETAILED DESCRIPTION

Figure 1:
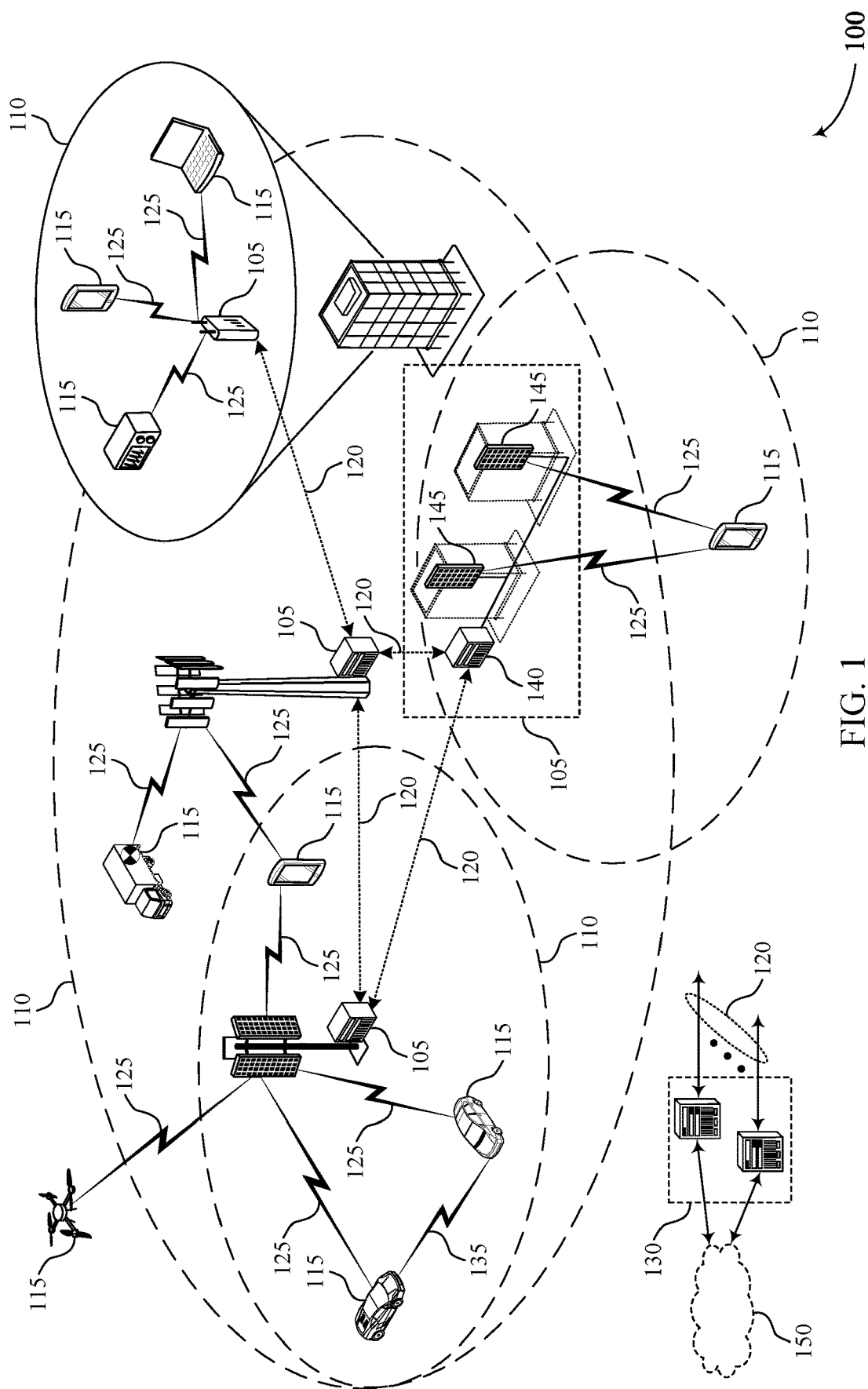
FIG. 1 illustrates an example of a wireless communications system that supports techniques for indicating coverage enhancement for random access procedures in wireless communications systems in accordance with aspects of the present disclosure.

Some wireless communications systems, such as fifth generation (5G) New Radio (NR) systems may support random access procedures for establishing connections between devices. For example, a user equipment (UE) may initiate a random access procedure with a base station to transition from an inactive state to a connected state such that the UE and the base station may share information via a communication link. Additionally or alternatively, devices may use random access procedures to perform handover procedures between cells in wireless communications systems, to perform link or beam recovery procedures, or to request uplink resource scheduling.

Some random access procedures, such as contention-based random access procedures, may include four steps with associated signaling. For example, a UE may transmit a random access preamble to a base station and receive, in response, a first random access message (e.g., a random access response message or a random access Message 2 (Msg2)) including timing information to align a transmission timing of uplink messages to a timing associated with the base station. If multiple UEs transmit random access preambles simultaneously, resulting in a collision, the base station and the UE may use additional signaling (e.g., steps three and four) to resolve the collision. For example, the UE may transmit a third random access message (e.g., a random access Message 3 (Msg3)) using resources indicated in the first random access message. In response, the base station may transmit a second random access message (e.g., a random access Message 4 (Msg4)) to resolve any collisions and to indicate the UE to transition to a connected state. In some cases, however, conditions associated with a channel between the UE and a base station may be unfavorable, which may lead to inefficient or inaccurate random access procedures. In such cases, devices may perform coverage enhancement (e.g., transmission repetition, beam refinement, etc.) to mitigate the effects of unfavorable channel conditions. It may be beneficial to implement a method whereby a base station may indicate coverage enhancement for random access procedures in wireless communications systems.

One such method may include a base station indicating whether coverage enhancement is associated with the second random access message using the first random access message (e.g., a random access response or random access Message 2 (Msg2)). In some examples, the base station may transmit the indication of coverage enhancement in a physical downlink shared channel (PDSCH) or downlink control information (DCI) included in the first random access message. In some examples, the base station may transmit the first random access message using temporary cell radio network temporary identifier (TC-RNTI) which implicitly indicates the coverage enhancement. For example, the base station may transmit the first random access message using an odd TC-RNTI or an even TC-RNTI to indicate whether or not coverage enhancement is associated with the second random access message. In some examples, the base station may jointly indicate (e.g., using one bit) coverage enhancement for a PDSCH and a physical downlink control channel (PDCCH) for the second random access message. In some examples, the base station may independently indicate (e.g., using at least two bits) coverage enhancement for the PDSCH, the PDCCH, or both for the second random access message.

In some examples, the base station may determine to indicate coverage enhancement based on conditions of a channel between the base station and the UE. For example, the base station may determine that a channel characteristic associated with the channel between the base station and the UE does not satisfy a threshold and may indicate coverage enhancement accordingly. In some examples, the base station may determine to indicate coverage enhancement based on receiving a request for coverage enhancement from the UE (e.g., via third random access message). Additionally or alternatively, the base station may determine a type of the UE (e.g., may determine that the UE is a reduced capability UE) based on receiving a random access preamble from the UE and may determine to perform coverage enhancement accordingly. In some implementations, the base station may receive the random access preamble from the UE and may determine that a resource allocation (e.g., a bandwidth part (BWP) allocation) for the random access procedure may be insufficient to enable reliable delivery of the second random access message. Accordingly, the base station may determine to perform coverage enhancement which may lead to an increased reliability of communication for the second random access message.

Additionally or alternatively, the base station may indicate a type of the coverage enhancement which may be associated with the second random access message. For example, the base station may transmit an indication (e.g., as a field or parameter) of a type of coverage enhancement in a PDSCH or DCI of the first random access message. In some examples, the base station may transmit DCI in the first random access message such that a location of the DCI in the first random access message implicitly indicates the type of coverage enhancement procedure. In some implementations, the base station may transmit the first random access message using a TC-RNTI which implicitly indicates the type of coverage enhancement. For example, the base station may use a TC-RNTI divisible by five to indicate no coverage enhancement, or a TC-RNTI with a remainder (e.g., one, two, three, or four) to indicate a type of coverage enhancement associated with the second random access message. In some examples, the base station or the UE may be configured with a type of coverage enhancement. In some examples, the base station may indicate a first type of coverage enhancement using the first random access procedure and then may determine to use a second type of coverage enhancement procedure based on receiving the third random access message (e.g., a random access Message 3 (Msg3)) from the UE. Accordingly, the base station may transmit the second random access message to the UE. Implementing aspects of the present disclosure may enable coverage enhancement for random access procedures which may lead to an increased efficiency or accuracy of communication.

Aspects of the disclosure are initially described in the context of wireless communications systems. Aspects of the disclosure are further described with respect to a process flow in a wireless communications system. Aspects of the disclosure are further illustrated by and described with reference to apparatus diagrams, system diagrams, and flowcharts that relate to techniques for indicating coverage enhancement for random access procedures in wireless communications systems.

FIG. 1 illustrates an example of a wireless communications system 100 that supports techniques for indicating coverage enhancement for random access procedures in wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers, for example, a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signalto-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the wireless communications system 100 may support a UE 115 performing a random access procedure to establish a connection with a base station 105. For example, a UE 115 and a base station 105 may perform a random access procedure to synchronize the UE 115 to a different cell, to re-establish synchronization in a service cell of the UE 115, to request uplink scheduling, or to obtain a downlink beam as part of a beam recovery procedure.

Some random access procedures may use four steps to establish a connection, perform synchronization, and resolve collisions. One such random access procedure may include a UE 115 transmitting a random access preamble based on a synchronization signal block (SSB) broadcasted by a base station 105. The UE 115 may determine time or frequency locations of a random access channel (RACH) via a mapping based on an index of the SSB. In some examples, random access transmissions may be configured to occur within a configurable set of slots (e.g., RACH slots) that repeat periodically. In each slot, there may be multiple frequency domain occasions (e.g., RACH occasions) which jointly cover a set of resource blocks based on a bandwidth associated with a random access preamble. For example, each RACH slot may include up to eight RACH occasions. The UE 115 may select a RACH occasion based on the index of the SSB. In some implementations, the SSB may indicate a RACH occasion in a frequency domain, in a time domain within a slot, and in a time domain between slots. If multiple occasions are associated with an SSB, the UE 115 may select an occasion having a uniform probability.

In some examples, the UE 115 may select a random access preamble to transmit from a set of up to 64 configured random access preambles. Each random access preamble may be configured with a periodicity (e.g., from 10 ms to 160 ms), a set of slots within a period, and a frequency domain resource indicated using a resource block index or a number of contiguous frequency domain occasions. In some implementations, the random access preamble may include a Zadoff-Chu sequence having a length equal to a prime integer. A random access preamble including 139 values of the Zadoff-Chu sequence may be referred to as a short preamble. Similarly, a random access preamble including 839 values of the Zadoff-Chu sequence may be referred to as a long preamble. A Zadoff-Chu sequence of length L may be used to generate different preamble sequences using up to L−1 different root indices. In some implementations, different UEs 115 may transmit cyclic-shifted preambles, a number of which may be based on a cell-level parameter (e.g., a zero-correlation-zone parameter provided in a system information block (SIB)) such that cyclic-shifts are larger than a largest delay in the cell. In some implementations, a random access preamble may be precoded using a discrete Fourier transform (DFT) prior to modulation. An output of an OFDM modulator may include a number of repetitions of the random access preamble with a cyclic prefix added once per repetition. In some implementations, a short random access preamble may support a subcarrier spacing of 60 kHz or 120 kHz and may occupy 12 resource blocks in a frequency domain. In some examples, the UE 115 may use a same beam for receiving the SSB and for transmitting the random access preamble. If the UE 115 does not receive a response to the random access preamble, the UE 115 may increase a transmission power associated with the random access preamble and re-transmit the random access preamble to the base station 105.

In response to receiving the random access preamble, the base station 105 may transmit a first random access message (e.g., a random access response message or a random access Message 2 (Msg2)). The random access response message may include information associated with the received random access preamble, timing correction information, a temporary identifier or TC-RNTI, and a scheduling grant for the UE 115 to use for transmitting a subsequent a third random access message (e.g., a Msg3) if a collision occurs (e.g., if multiple UEs 115 transmit a same random access preamble using a same set of resources).

Accordingly, the UE 115 may transmit the third random access message to the base station 105. In some implementations, the third random access message may include a device identifier (e.g., a cell radio network temporary identifier (C-RNTI) or a core network device identifier), a radio resource control (RRC) message indicating a state of the UE 115, and a buffer status request (BSR) MAC control element (CE) if there is data for the UE 115 to transmit to the base station 105. In some examples, the UE 115 may transmit the third random access message using resources and the TC-RNTI indicated in the random access response message.

In response to receiving the third random access message, the base station 105 may transmit a second random access message (e.g., a Msg4) to the UE 115 indicating the UE 115 to transition to a connected state. In some examples, the UE 115 may transmit HARQ acknowledgement indication if the UE 115 successfully receives the second random access message or may restart the random access procedure if the UE 115 fails to receive the second random access message. In some examples, the random access procedure may be hindered due to poor conditions associated with a channel between the UE 115 and the base station 105. In such examples, the UE 115 and the base station 105 may use coverage enhancement for the random access procedure.

The base station 105 may determine (e.g., based on receiving the random access preamble) to perform coverage enhancement for the random access procedure. Accordingly, the base station 105 may transmit an indication of coverage enhancement to the UE 115. For example, the base station 105 may transmit an indication of whether coverage enhancement is associated with a second random access message (e.g., a Msg4) using a first random access message (e.g., a Msg2). In some examples, the base station 105 may transmit the indication (e.g., as a field or parameter) in a PDSCH or a DCI of the first random access message. In some implementations, the base station 105 may transmit the first random access message using a TC-RNTI which implicitly indicates the coverage enhancement. The base station 105 may jointly indicate (e.g., using one bit) or independent indicate (e.g., using at least two bits) whether coverage enhancement is associated with a PDCCH or a PDSCH of the second random access message. Additionally or alternatively, the base station 105 may indicate a type of the coverage enhancement to the UE 115. In some examples, the base station 105 may indicate a first type of coverage enhancement using the first random access message and may determine to perform a second type of coverage enhancement based on receiving a third random access message (e.g., a Msg3) from the UE 115. The base station 105 may transmit the second random access message based on determining whether to perform coverage enhancement. Implementing aspects of the present disclosure may enable the wireless communication system 100 to perform coverage enhancement for random access procedures which may lead to an increased reliability or an increased efficiency, among other benefits.

Figure 2:
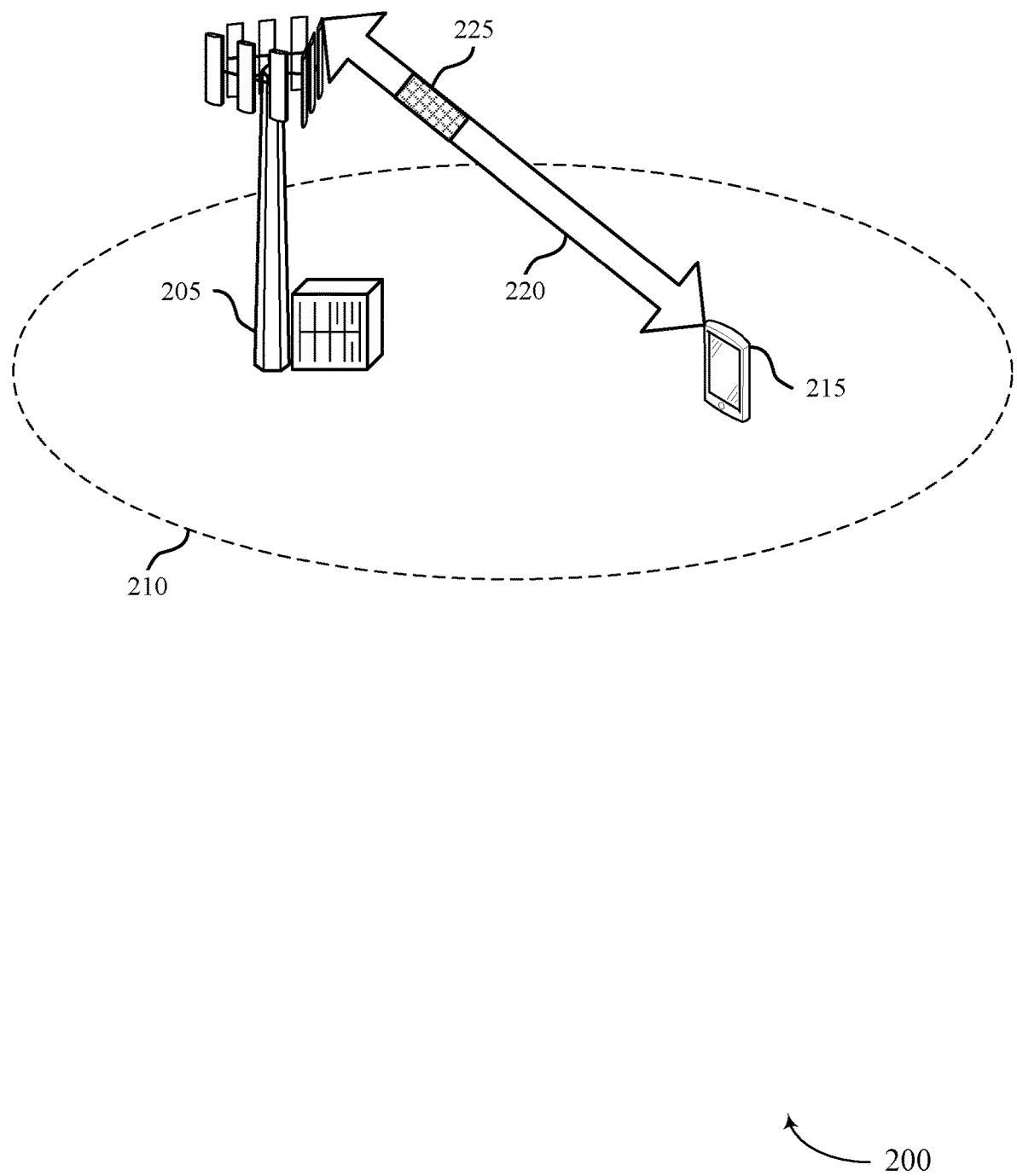
FIG. 2 illustrates an example of a wireless communications system that supports techniques for indicating coverage enhancement for random access procedures in wireless communications systems in accordance with aspects of the present disclosure.

FIG. 2 illustrates an example of a wireless communications system 200 that supports techniques for indicating coverage enhancement for random access procedures in wireless communication systems, in accordance with one or more aspects of the present disclosure. The wireless communications system 200 may implement aspects of a wireless communications system 100 as described with reference to FIG. 1. The wireless communications system 200 may include a UE 215 which may be an example of a UE 115 as described with reference to FIG. 1. The wireless communications system 200 may also include a base station 205 as described with reference to FIG. 1. The base station 205 may be associated with a cell providing wireless communications system within a coverage area 210. The UE 215 and the base station 205 may perform a random access procedure using a channel 220. In some examples, the UE 215 and the base station 105 may use coverage enhancement for the random access procedure if, for example, the channel 220 is experiencing poor channel conditions.

The base station 205 may indicate, to the UE 215, whether coverage enhancement is associated with a second random access message (e.g., a Msg4) using a first random access message 225 (e.g., a random access response or Msg2). For example, the base station 205 may transmit an indication (e.g., as a field or parameter) to the UE 215 included in a PDSCH or a DCI (e.g., a scheduling DCI) of the first random access message 225. In some implementations, the base station 205 may transmit the first random access message 225 using a TC-RNTI which implicitly indicates whether coverage enhancement is associated with the second random access message. For example, the base station 205 may transmit the first random access message 225 using an odd TC-RNTI or an even TC-RNTI to indicate the coverage enhancement. The base station 205 may jointly (e.g., using one bit) or independently (e.g., using at least two bits) indicate coverage enhancement for a PDCCH and a PDSCH associated with the second random access message. For example, the base station 205 may determine that coverage enhancement is needed for only the PDCCH or the PDSCH and indicate the coverage enhancement independently according to the determination.

In some examples, the base station 205 may determine to indicate coverage enhancement based on conditions of the channel 220 between the base station 205 and the UE 215. For example, the base station 205 may determine that a characteristic (e.g., a reference signal received power (RSRP) or a signal-to-interference-plus-noise ratio (SINR)) of the channel 220 fails to satisfy a threshold and may transmit an indication of coverage enhancement accordingly. In some examples, the base station 205 may receive a request for coverage enhancement from the UE 215 using a third random access message (e.g., a random access Message 1 (Msg1) or random access preamble) and may transmit an indication of coverage enhancement accordingly. Additionally or alternatively, the base station 205 may (e.g., based on the third random access message) that a resource allocation or BWP allocation for the random access procedure is insufficient to enable reliable delivery of the second random access message and may determine to perform coverage enhancement accordingly. In some examples, the base station 205 may determine type of the UE 215 based on receiving a random access preamble from the UE 215. For example, the base station 205 may determine that the UE 215 has a reduced capability (e.g., a reduced processing capability, a reduced transmission capability, etc.) and may determine to perform coverage enhancement which may to mitigate any effects of the reduced capability of the UE 215. In some examples, the base station 205 may indicate coverage enhancement using the first random access message 225 and then may determine not to perform coverage enhancement based on receiving a fourth random access message (e.g., a Msg3) from the UE 215.

Additionally or alternatively, the base station 205 may indicate a type of coverage enhancement using the first random access message 225. For example, the base station 205 may transmit an indication (e.g., a field or parameter having a number of bits) to the UE 215 in a PDSCH or a DCI of the second random access message. In some implementations, the base station 205 may transmit a DCI in the second random access message such that the location of the DCI implicitly indicates a type of coverage enhancement. In some examples, the base station 215 may transmit the first random access message 225 using a TC-RNTI which implicitly indicates the type of coverage enhancement. For example, the base station 205 may use a TC-RNTI that is divisible by five to indicate that no coverage enhancement is associated with the second random access message and may use a TC-RNTI having a remainder (e.g., one, two, three, or four) when divided by five to indicate a type of coverage enhancement. In some examples, the base station 205 may indicate a first type of coverage enhancement using the first random access message 225 and may determine to switch to a second type of coverage enhancement (e.g., based on receiving a third random access message from the UE 215) for transmitting the second random access message. Implementing aspects of the present disclosure may enable the wireless communications system 200 to enable coverage enhancement for random access procedures, which may lead to an increased efficiency or accuracy of communication between devices, among other benefits.

Figure 3:
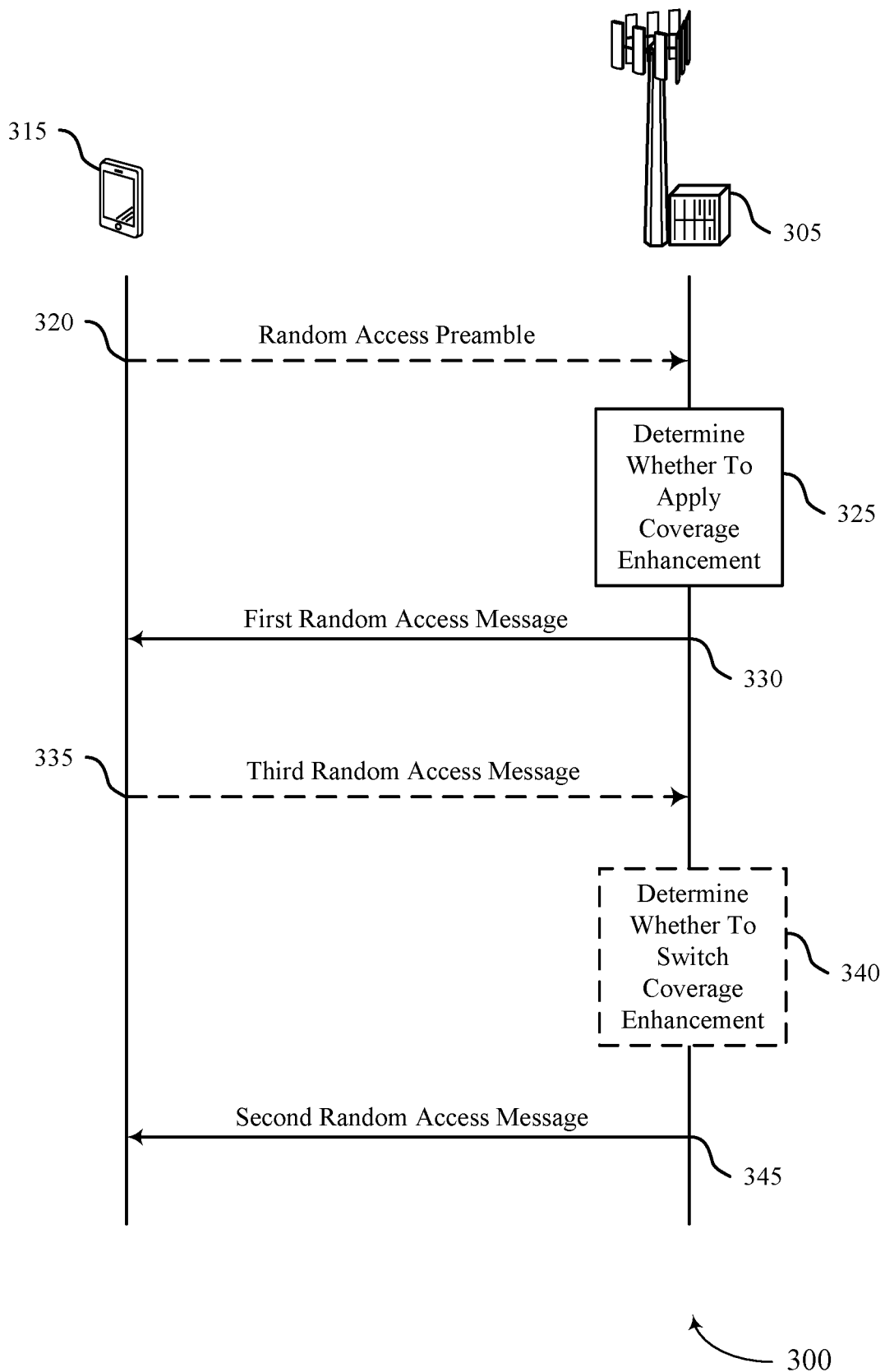
FIG. 3 illustrates an example of a process flow in a system that supports techniques for indicating coverage enhancement for random access procedures in wireless communications systems in accordance with aspects of the present disclosure.

FIG. 3 illustrates an example of a process flow 300 is a system that supports techniques for requesting coverage enhancement for random access procedures in wireless communications systems in accordance with one or more aspects of the present disclosure. In some examples, the process flow 300 may be implemented in accordance with one or more aspects of a wireless communications system 100 or 200 as described with reference to FIGS. 1 and 2. The process flow 300 may include a UE 315 and a base station 305 which may be examples of the corresponding devices described herein. Alternative examples of the following may be implemented in which some processes are performed in a different order than described or are not performed at all. In some examples, the processes may include additional features not mentioned below, or further processes may be added.

At 320, the UE 315 may transmit a random access preamble to the base station 305, initiating a random access procedure to establish a communication link with the base station 305. In some examples, the UE 315 may request coverage enhancement for the random access procedure using the random access preamble.

At 325, the base station 305 may determine whether to apply coverage enhancement to a second random access message (e.g., a Msg 4). For example, the base station 305 may determine, based on receiving the random access preamble from the UE 315, that a resource allocation (e.g., a BWP allocation) for the random access procedure is insufficient to enable reliable delivery of the second random access message and may determine to perform coverage enhancement for the second random access message which may lead to an increased reliability. Additionally or alternatively, the base station 305 may determine a type of the UE 315 using the random access preamble and may determine to perform coverage enhancement accordingly. For example, the base station 305 may determine that the UE 315 has a reduced capability (e.g., a reduced processing capability, a reduced transmission capability, etc.) and may determine to perform coverage enhancement which may mitigate any effects of the reduced capability of the UE 315.

At 330, in response to receiving the random access preamble, the base station 305 may transmit a first random access message (e.g., a random access response or Msg2). The base station 305 may use the first random access message to indicate whether coverage enhancement is associated with the second random access message (e.g., a Msg4). In some examples, the base station 305 may transmit an indication (e.g., a field or parameter having a number of bits) of coverage enhancement in a PDSCH or a DCI of the second random access message. In some examples, the base station 305 may transmit the first random access message using a TC-RNTI implicitly indicating coverage enhancement. The base station 305 may jointly or independently indicate coverage enhancement for a PDSCH and a PDCCH of the second random access message. Additionally or alternatively, the base station 305 may indicate a type of coverage enhancement associated with the second random access message.

At 335, in response to receiving the first random access message, the UE 315 may transmit a third random access message (e.g., a Msg3). In some examples, the UE 315 may use the third random access message to request coverage enhancement for the second random access message.

In some implementations, at 340, the base station 305 may determine whether to perform coverage enhancement or to a switch to a different type of coverage enhancement for the second random access message based on transmitting the first random access message and receiving the third random access message. For example, the base station 305 may indicate coverage enhancement using the first random access message and the change a type of coverage enhancement or determine to refrain from performing the coverage enhancement based on receiving the third random access message from the UE 315. Accordingly, at 345, the base station 305 may transmit the second random access message. Implementing aspects of the process flow 300 may enable a wireless communications system to use coverage enhancement for random access procedures which may lead to an increased efficiency of communication, among other benefits.

Figure 4:
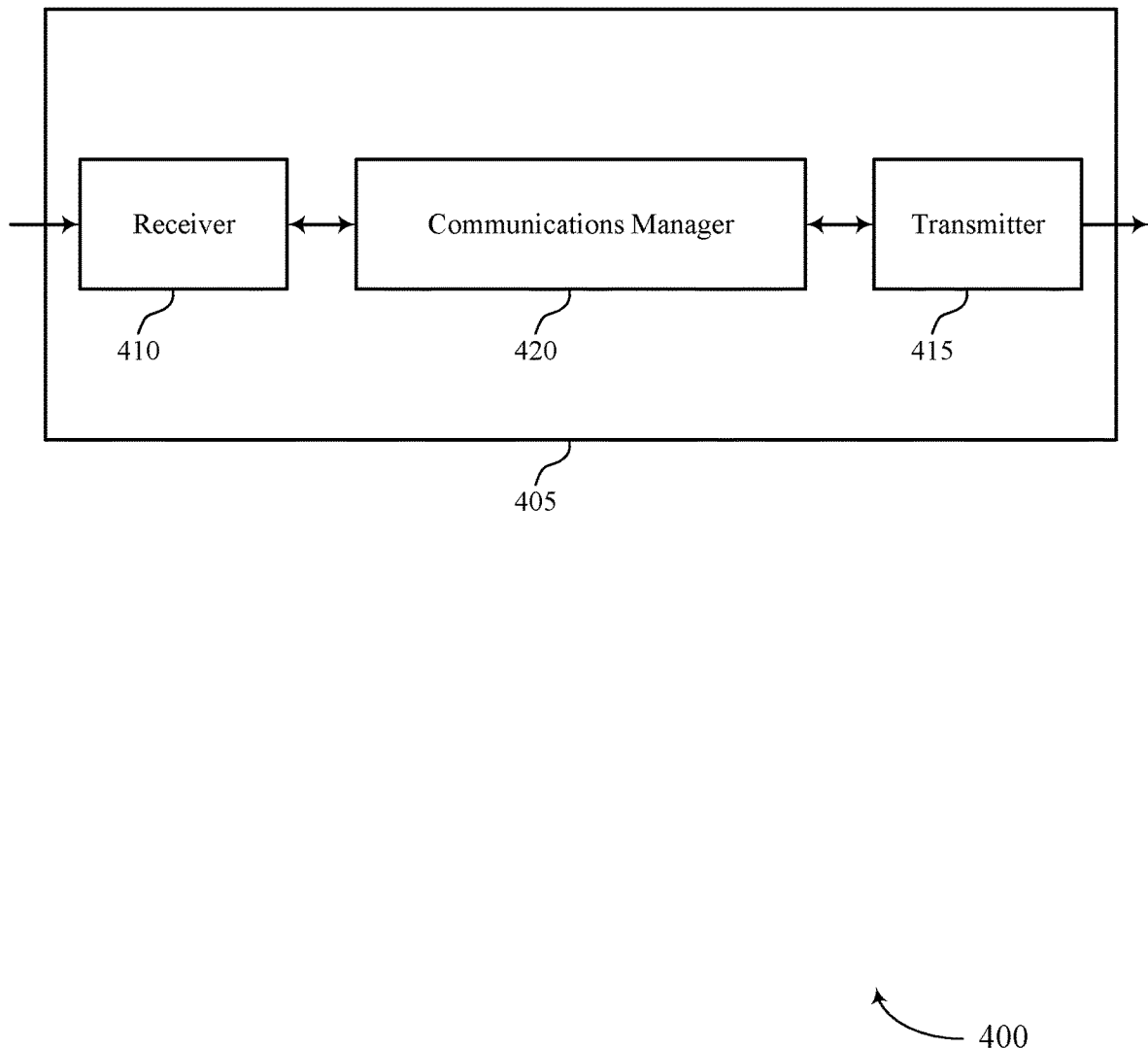
FIGS. 4 and 5 show block diagrams of devices that support techniques for indicating coverage enhancement for random access procedures in wireless communications systems in accordance with aspects of the present disclosure.

FIG. 4 shows a block diagram 400 of a device 405 that supports techniques for indicating coverage enhancement for random access procedures in wireless communications systems in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for indicating coverage enhancement for random access procedures in wireless communications systems). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for indicating coverage enhancement for random access procedures in wireless communications systems). In some examples, the transmitter 415 may be co-located with a receiver 410 in a transceiver component. The transmitter 415 may utilize a single antenna or a set of multiple antennas.

The communications manager 420, the receiver 410, the transmitter 415, or various combinations thereof or various components thereof may be examples of means for performing various aspects of techniques for indicating coverage enhancement for random access procedures in wireless communications systems as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving, from a base station, a first random access message including an indication as to whether a coverage enhancement is associated with a second random access message, the indication based on a condition of a channel used to receive the second random access message from the base station failing to satisfy a threshold. The communications manager 420 may be configured as or otherwise support a means for receiving, from the base station, the second random access message based on receiving the indication.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for coverage enhancement in wireless communications systems, such that the device 405 may experience a reduced processing, a reduced power consumption, an increased reliability of communications, or a more efficient resource utilization, among other benefits.

Figure 5:
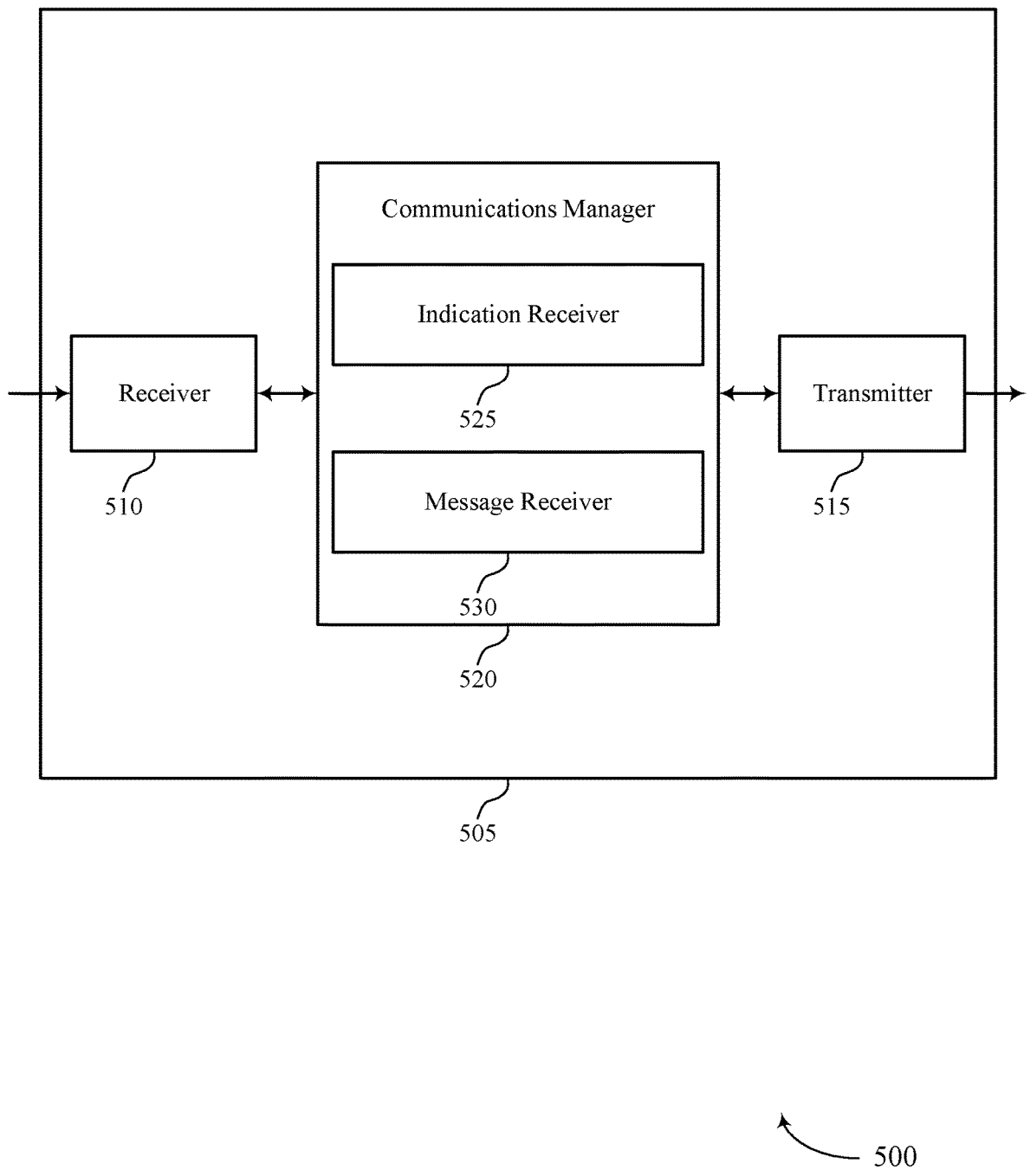

FIG. 5 shows a block diagram 500 of a device 505 that supports techniques for indicating coverage enhancement for random access procedures in wireless communications systems in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for indicating coverage enhancement for random access procedures in wireless communications systems). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for indicating coverage enhancement for random access procedures in wireless communications systems). In some examples, the transmitter 515 may be co-located with a receiver 510 in a transceiver component. The transmitter 515 may utilize a single antenna or a set of multiple antennas.

The device 505, or various components thereof, may be an example of means for performing various aspects of techniques for indicating coverage enhancement for random access procedures in wireless communications systems as described herein. For example, the communications manager 520 may include an indication receiver 525 a message receiver 530, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The indication receiver 525 may be configured as or otherwise support a means for receiving, from a base station, a first random access message including an indication as to whether a coverage enhancement is associated with a second random access message, the indication based on a condition of a channel used to receive the second random access message from the base station failing to satisfy a threshold. The message receiver 530 may be configured as or otherwise support a means for receiving, from the base station, the second random access message based on receiving the indication.

Figure 6:
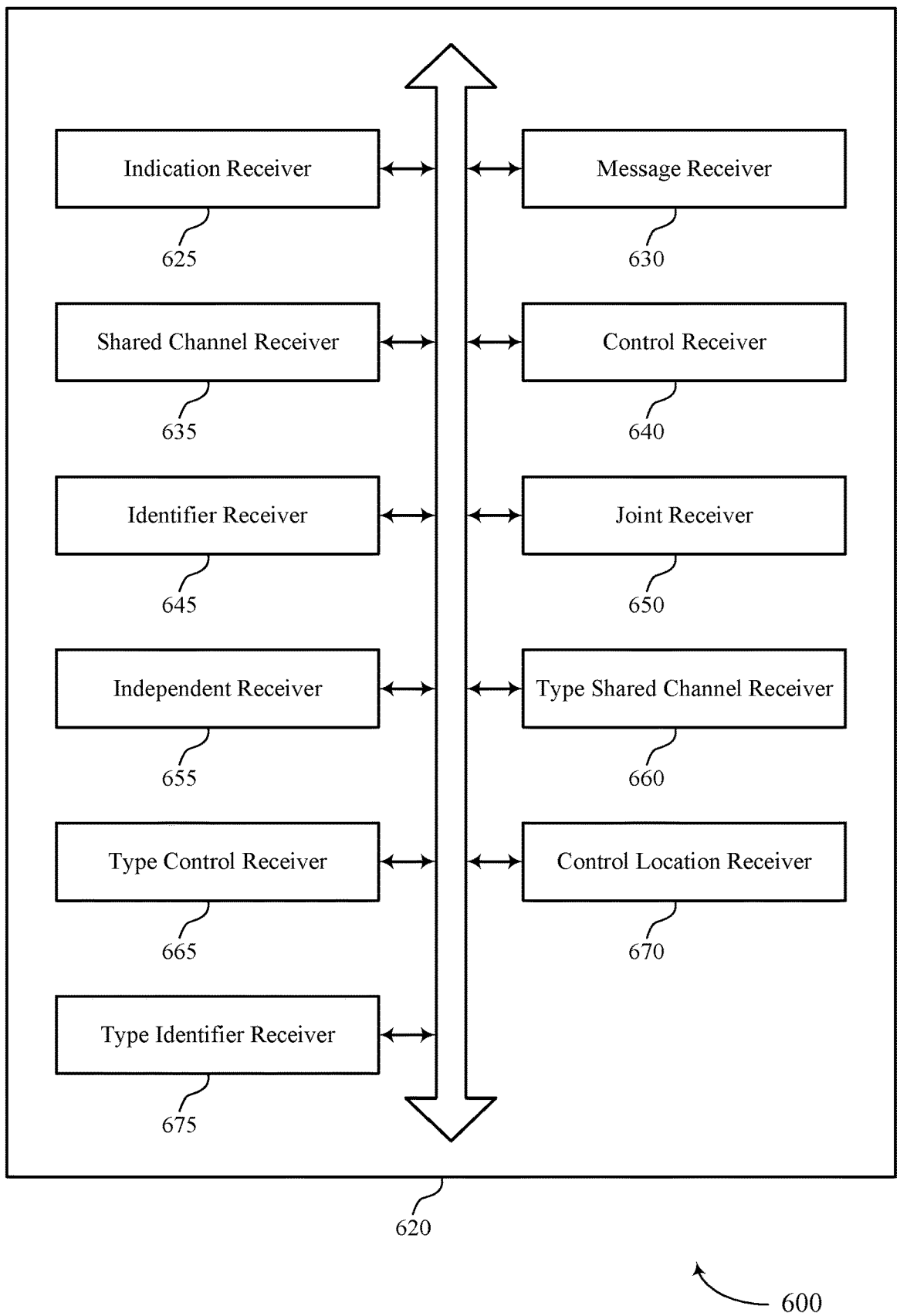
FIG. 6 shows a block diagram of a communications manager that supports techniques for indicating coverage enhancement for random access procedures in wireless communications systems in accordance with aspects of the present disclosure.

FIG. 6 shows a block diagram 600 of a communications manager 620 that supports techniques for indicating coverage enhancement for random access procedures in wireless communications systems in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for indicating coverage enhancement for random access procedures in wireless communications systems as described herein. For example, the communications manager 620 may include an indication receiver 625, a message receiver 630, a shared channel receiver 635, a control receiver 640, an identifier receiver 645, a joint receiver 650, an independent receiver 655, a type shared channel receiver 660, a type control receiver 665, a control location receiver 670, a type identifier receiver 675, or any combination thereof. Each of these components may communicate, directly or indirectly, with one another (e.g., via one or more buses).

The communications manager 620 may support wireless communication at a UE in accordance with examples as disclosed herein. The indication receiver 625 may be configured as or otherwise support a means for receiving, from a base station, a first random access message including an indication as to whether a coverage enhancement is associated with a second random access message, the indication based on a condition of a channel used to receive the second random access message from the base station failing to satisfy a threshold. The message receiver 630 may be configured as or otherwise support a means for receiving, from the base station, the second random access message based on receiving the indication.

In some examples, to support receiving the first random access message, the shared channel receiver 635 may be configured as or otherwise support a means for receiving an indication of whether the coverage enhancement is associated with the second random access message in a physical downlink shared channel payload associated with the first random access message.

In some examples, to support receiving the first random access message, the control receiver 640 may be configured as or otherwise support a means for receiving an indication of whether the coverage enhancement is associated with the second random access message in downlink control information associated with the first random access message.

In some examples, to support receiving the first random access message, the identifier receiver 645 may be configured as or otherwise support a means for receiving the first random access message using a temporary cell radio network temporary identifier, where the first random access message implicitly indicates whether the coverage enhancement is associated with the second random access message based on the temporary cell radio network temporary identifier.

In some examples, to support receiving the first random access message, the joint receiver 650 may be configured as or otherwise support a means for receiving an indication including one bit configured for indicating whether the coverage enhancement is associated with a physical downlink control channel payload and a physical downlink shared channel payload associated with the second random access message, where the first random access message includes the indication.

In some examples, to support receiving the first random access message, the independent receiver 655 may be configured as or otherwise support a means for receiving an indication including at least two bits configured for independently indicating whether the coverage enhancement is associated with a physical downlink control channel payload or a physical downlink shared channel payload or both associated with the second random access message, where the first random access message includes the indication.

In some examples, to support receiving the first random access message, the type shared channel receiver 660 may be configured as or otherwise support a means for receiving an indication of a type of the coverage enhancement in a physical downlink shared channel payload associated with the first random access message, where the first random access message includes the indication.

In some examples, to support receiving the first random access message, the type control receiver 665 may be configured as or otherwise support a means for receiving an indication of a type of the coverage enhancement in a downlink control information payload associated with the first random access message, where the first random access message includes the indication.

In some examples, to support receiving the first random access message, the control location receiver 670 may be configured as or otherwise support a means for receiving a downlink control information payload associated with the first random access message, where the first random access message implicitly indicates a type of the coverage enhancement associated with the second random access message based on a location of the downlink control information payload in the first random access message.

In some examples, to support receiving the first random access message, the type identifier receiver 675 may be configured as or otherwise support a means for receiving the first random access message using a temporary cell radio network temporary identifier, where the first random access message implicitly indicates a type of the coverage enhancement associated with the second random access message based on the temporary cell radio network temporary identifier.

Figure 7:
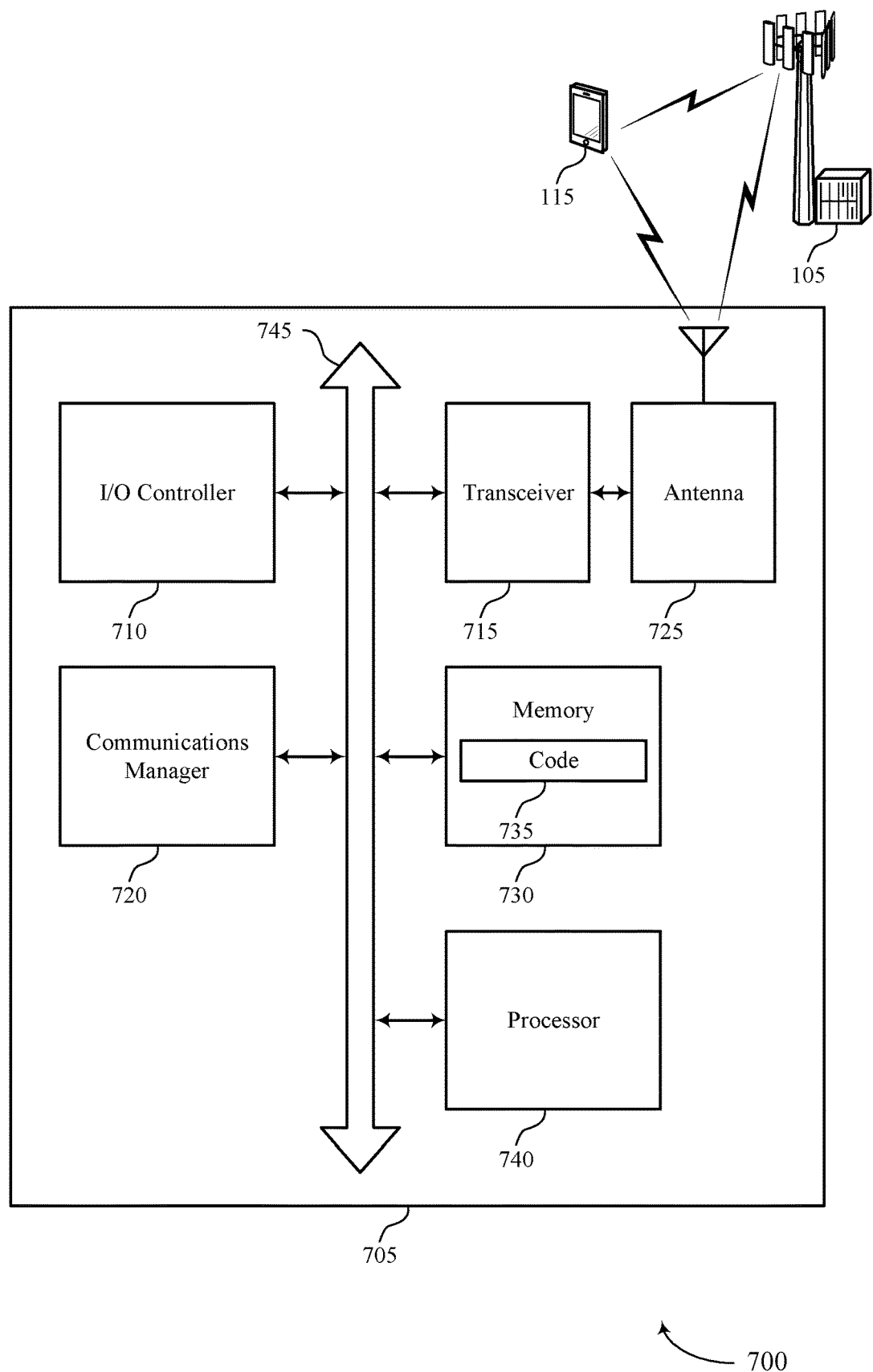
FIG. 7 shows a diagram of a system including a device that supports techniques for indicating coverage enhancement for random access procedures in wireless communications systems in accordance with aspects of the present disclosure.

FIG. 7 shows a diagram of a system 700 including a device 705 that supports techniques for indicating coverage enhancement for random access procedures in wireless communications systems in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for indicating coverage enhancement for random access procedures in wireless communications systems). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving, from a base station, a first random access message including an indication as to whether a coverage enhancement is associated with a second random access message, the indication based on a condition of a channel used to receive the second random access message from the base station failing to satisfy a threshold. The communications manager 720 may be configured as or otherwise support a means for receiving, from the base station, the second random access message based on receiving the indication.

By including or configuring the 705 manager 720 in accordance with examples as described herein, the device 705 may support techniques for coverage enhancement in wireless communications systems, such that the device 705 may experience a reduced processing, a reduced power consumption, an increased reliability of communications, or a more efficient resource utilization, among other benefits.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for indicating coverage enhancement for random access procedures in wireless communications systems as described herein, or the processor 740 and the memory 730 may be otherwise configured to perform or support such operations.

Figure 8:
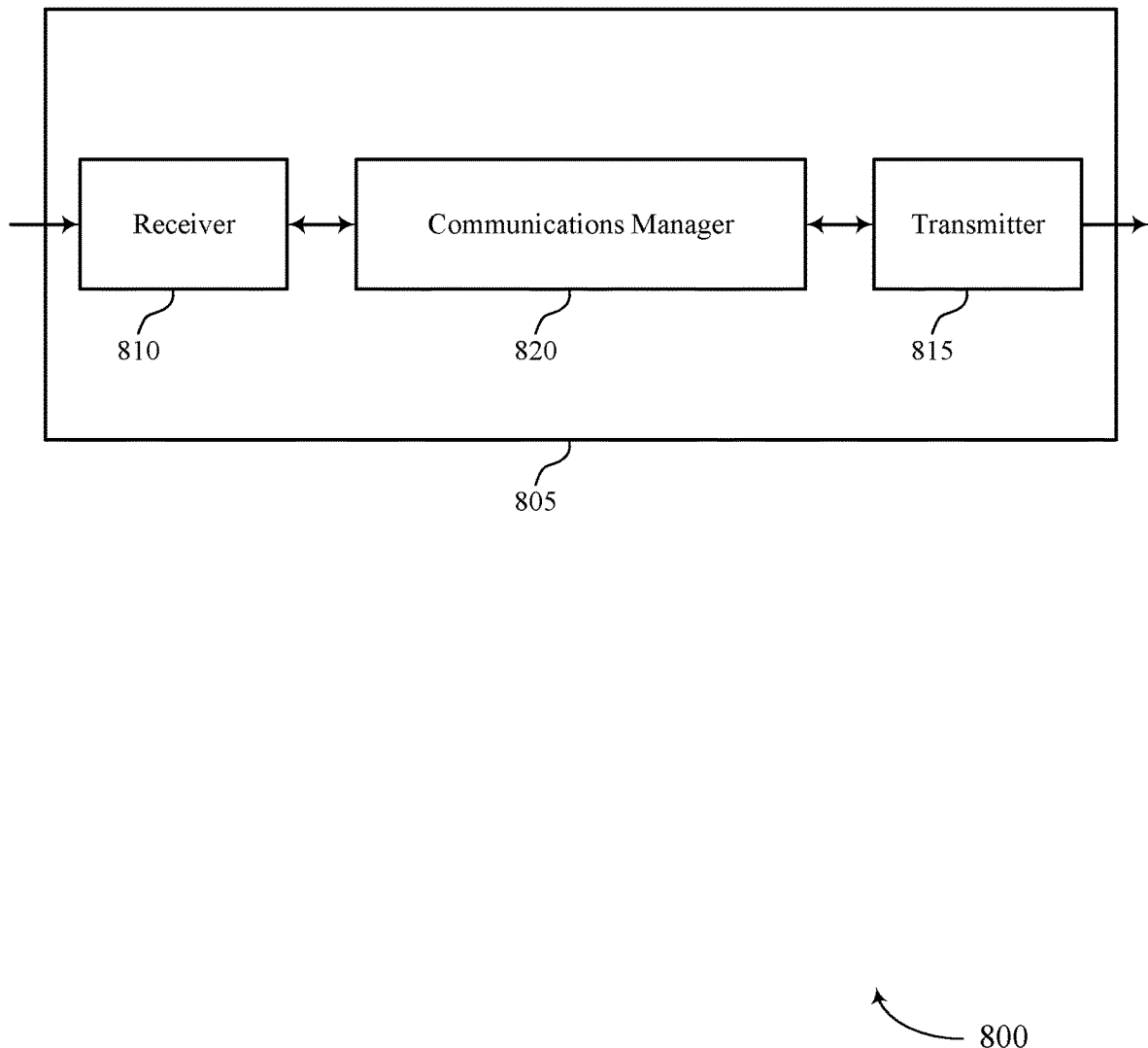
FIGS. 8 and 9 show block diagrams of devices that support techniques for indicating coverage enhancement for random access procedures in wireless communications systems in accordance with aspects of the present disclosure.

FIG. 8 shows a block diagram 800 of a device 805 that supports techniques for indicating coverage enhancement for random access procedures in wireless communications systems in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for indicating coverage enhancement for random access procedures in wireless communications systems). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for indicating coverage enhancement for random access procedures in wireless communications systems). In some examples, the transmitter 815 may be co-located with a receiver 810 in a transceiver component. The transmitter 815 may utilize a single antenna or a set of multiple antennas.

The communications manager 820, the receiver 810, the transmitter 815, or various combinations thereof or various components thereof may be examples of means for performing various aspects of techniques for indicating coverage enhancement for random access procedures in wireless communications systems as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting, to a UE, a first random access message including an indication as to whether a coverage enhancement is associated with a second random access message, the indication based on a condition of a channel used to transmit the second random access message from the base station to the UE failing to satisfy a threshold. The communications manager 820 may be configured as or otherwise support a means for transmitting, to the UE, the second random access message based on transmitting the indication.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for coverage enhancement in wireless communications systems, such that the device 805 may experience a reduced processing, a reduced power consumption, an increased reliability of communications, or a more efficient resource utilization, among other benefits.

Figure 9:
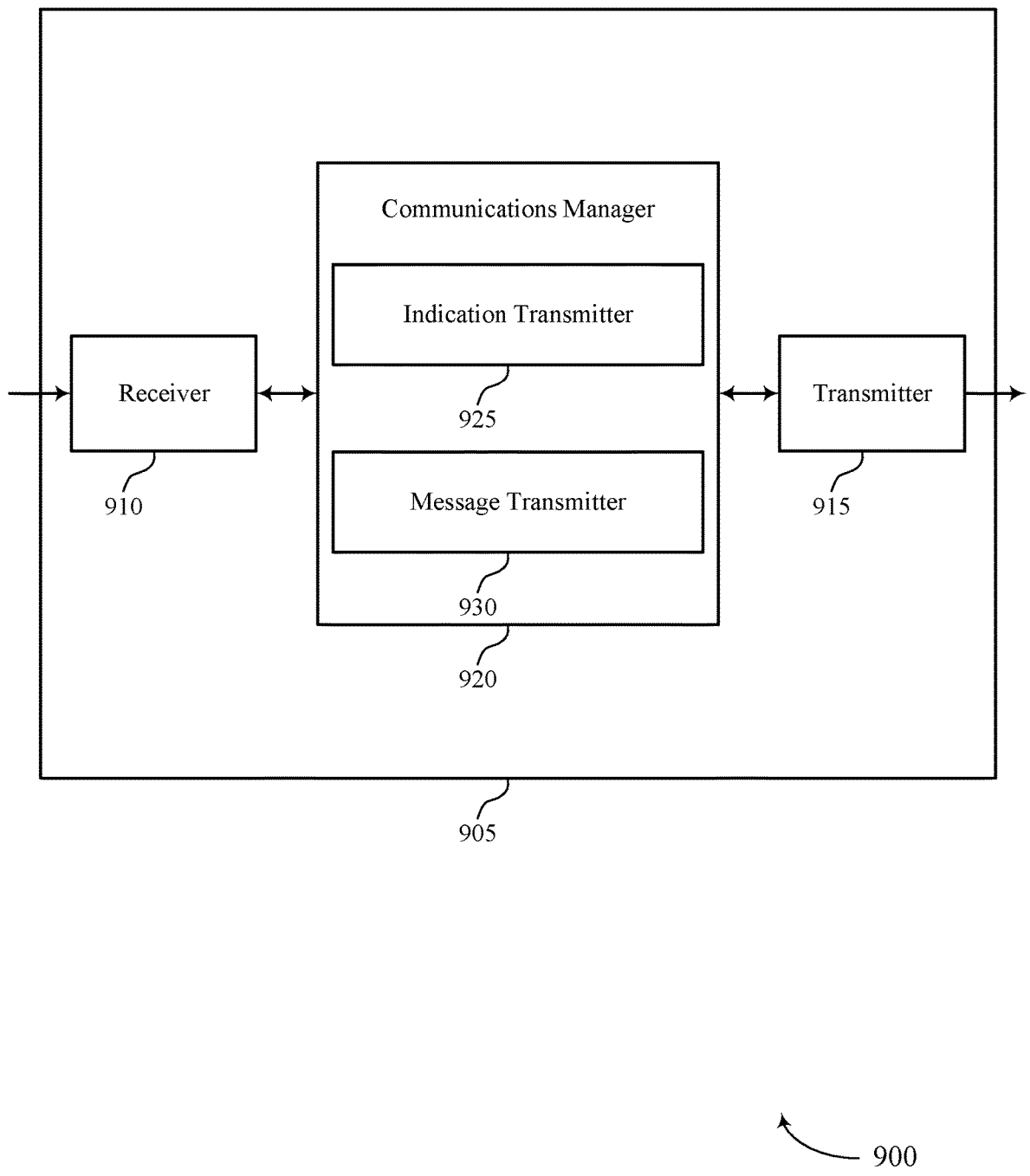

FIG. 9 shows a block diagram 900 of a device 905 that supports techniques for indicating coverage enhancement for random access procedures in wireless communications systems in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for indicating coverage enhancement for random access procedures in wireless communications systems). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for indicating coverage enhancement for random access procedures in wireless communications systems). In some examples, the transmitter 915 may be co-located with a receiver 910 in a transceiver component. The transmitter 915 may utilize a single antenna or a set of multiple antennas.

The device 905, or various components thereof, may be an example of means for performing various aspects of techniques for indicating coverage enhancement for random access procedures in wireless communications systems as described herein. For example, the communications manager 920 may include an indication transmitter 925 a message transmitter 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The indication transmitter 925 may be configured as or otherwise support a means for transmitting, to a UE, a first random access message including an indication as to whether a coverage enhancement is associated with a second random access message, the indication based on a condition of a channel used to transmit the second random access message from the base station to the UE failing to satisfy a threshold. The message transmitter 930 may be configured as or otherwise support a means for transmitting, to the UE, the second random access message based on transmitting the indication.

Figure 10:
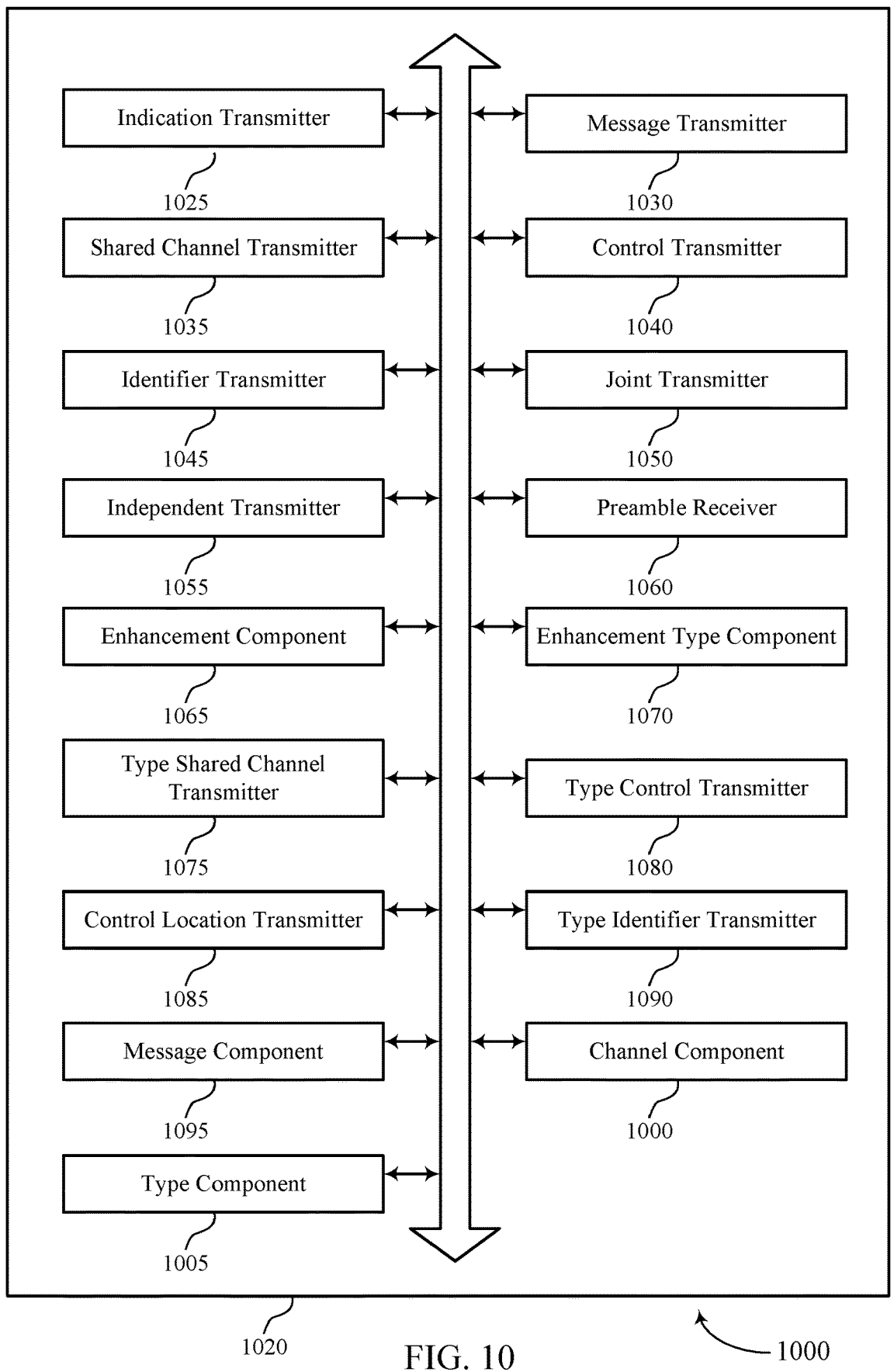
FIG. 10 shows a block diagram of a communications manager that supports techniques for indicating coverage enhancement for random access procedures in wireless communications systems in accordance with aspects of the present disclosure.

FIG. 10 shows a block diagram 1000 of a communications manager 1020 that supports techniques for indicating coverage enhancement for random access procedures in wireless communications systems in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for indicating coverage enhancement for random access procedures in wireless communications systems as described herein. For example, the communications manager 1020 may include an indication transmitter 1025, a message transmitter 1030, a shared channel transmitter 1035, a control transmitter 1040, an identifier transmitter 1045, a joint transmitter 1050, an independent transmitter 1055, a preamble receiver 1060, an enhancement component 1065, an enhancement type component 1070, a type shared channel transmitter 1075, a type control transmitter 1080, a control location transmitter 1085, a type identifier transmitter 1090, a message component 1095, a channel component 10100, a type component 10105, or any combination thereof. Each of these components may communicate, directly or indirectly, with one another (e.g., via one or more buses).

The communications manager 1020 may support wireless communication at a base station in accordance with examples as disclosed herein. The indication transmitter 1025 may be configured as or otherwise support a means for transmitting, to a UE, a first random access message including an indication as to whether a coverage enhancement is associated with a second random access message, the indication based on a condition of a channel used to transmit the second random access message from the base station to the UE failing to satisfy a threshold. The message transmitter 1030 may be configured as or otherwise support a means for transmitting, to the UE, the second random access message based on transmitting the indication.

In some examples, to support transmitting the first random access message, the shared channel transmitter 1035 may be configured as or otherwise support a means for transmitting an indication of whether the coverage enhancement is associated with the second random access message in a physical downlink shared channel payload associated with the first random access message.

In some examples, to support transmitting the first random access message, the control transmitter 1040 may be configured as or otherwise support a means for transmitting an indication of whether the coverage enhancement is associated with the second random access message in downlink control information associated with the first random access message.

In some examples, to support transmitting the first random access message, the identifier transmitter 1045 may be configured as or otherwise support a means for transmitting the first random access message using a temporary cell radio network temporary identifier, where the first random access message implicitly indicates whether the coverage enhancement is associated with the second random access message based on the temporary cell radio network temporary identifier.

In some examples, to support transmitting the first random access message, the joint transmitter 1050 may be configured as or otherwise support a means for transmitting an indication including one bit configured for indicating whether the coverage enhancement is associated with a physical downlink control channel payload and a physical downlink shared channel payload associated with the second random access message, where the first random access message includes the indication.

In some examples, to support transmitting the first random access message, the independent transmitter 1055 may be configured as or otherwise support a means for transmitting an indication including at least two bits configured for independently indicating whether the coverage enhancement is associated with a physical downlink control channel payload or a physical downlink shared channel payload or both associated with the second random access message, where the first random access message includes the indication.

In some examples, the preamble receiver 1060 may be configured as or otherwise support a means for receiving, from the UE, a random access preamble, where transmitting the first random access message is in response to receiving the random access preamble.

In some examples, the channel component 10100 may be configured as or otherwise support a means for determining a channel characteristic associated with the channel between the base station and the UE based on receiving the random access preamble, where transmitting the first random access message is based on the channel characteristic.

In some examples, the channel characteristic includes one or more of a reference signal received power or a signal-to-interference-plus-noise-ratio.

In some examples, to support receiving the random access preamble, the preamble receiver 1060 may be configured as or otherwise support a means for receiving, from the UE, a random access preamble requesting the coverage enhancement associated with the second random access message, where transmitting the first random access message is based on receiving the first random access message.

In some examples, the type component 10105 may be configured as or otherwise support a means for determining a type of the UE based on receiving the random access preamble, where transmitting the first random access message is based on the type of the UE.

In some examples, the enhancement component 1065 may be configured as or otherwise support a means for determining to perform the coverage enhancement associated with the second random access message, where transmitting the first random access message is based on the determining. In some examples, the message transmitter 1030 may be configured as or otherwise support a means for transmitting the second random access message according to the coverage enhancement.

In some examples, the enhancement type component 1070 may be configured as or otherwise support a means for determining that the base station is configured to use a first type of coverage enhancement associated with the second random access message, where transmitting the second random access message is based on the determining.

In some examples, to support transmitting the first random access message, the type shared channel transmitter 1075 may be configured as or otherwise support a means for transmitting an indication of a type of the coverage enhancement in a physical downlink shared channel payload associated with the first random access message, where the first random access message includes the indication.

In some examples, to support transmitting the first random access message, the type control transmitter 1080 may be configured as or otherwise support a means for transmitting an indication of a type of the coverage enhancement in a downlink control information payload associated with the first random access message, where the first random access message includes the indication.

In some examples, to support transmitting the first random access message, the control location transmitter 1085 may be configured as or otherwise support a means for transmitting a downlink control information payload associated with the first random access message, where the first random access message implicitly indicates a type of the coverage enhancement associated with the second random access message based on a location of the downlink control information payload in the first random access message.

In some examples, to support transmitting the first random access message, the type identifier transmitter 1090 may be configured as or otherwise support a means for transmitting the first random access message using a temporary cell radio network temporary identifier, where the first random access message implicitly indicates a type of the coverage enhancement associated with the second random access message based on the temporary cell radio network temporary identifier.

In some examples, the enhancement type component 1070 may be configured as or otherwise support a means for determining a first type of the coverage enhancement associated with the second random access message, where transmitting the first random access message includes transmitting an indication of the first type. In some examples, the message component 1095 may be configured as or otherwise support a means for receiving, from the UE, a third random access message based on transmitting the first random access message. In some examples, the enhancement type component 1070 may be configured as or otherwise support a means for determining a second type of the coverage enhancement associated with the second random access message based on transmitting the first random access message and receiving the fifth random access message, where transmitting the second random access message is based on determining the second type.

Figure 11:
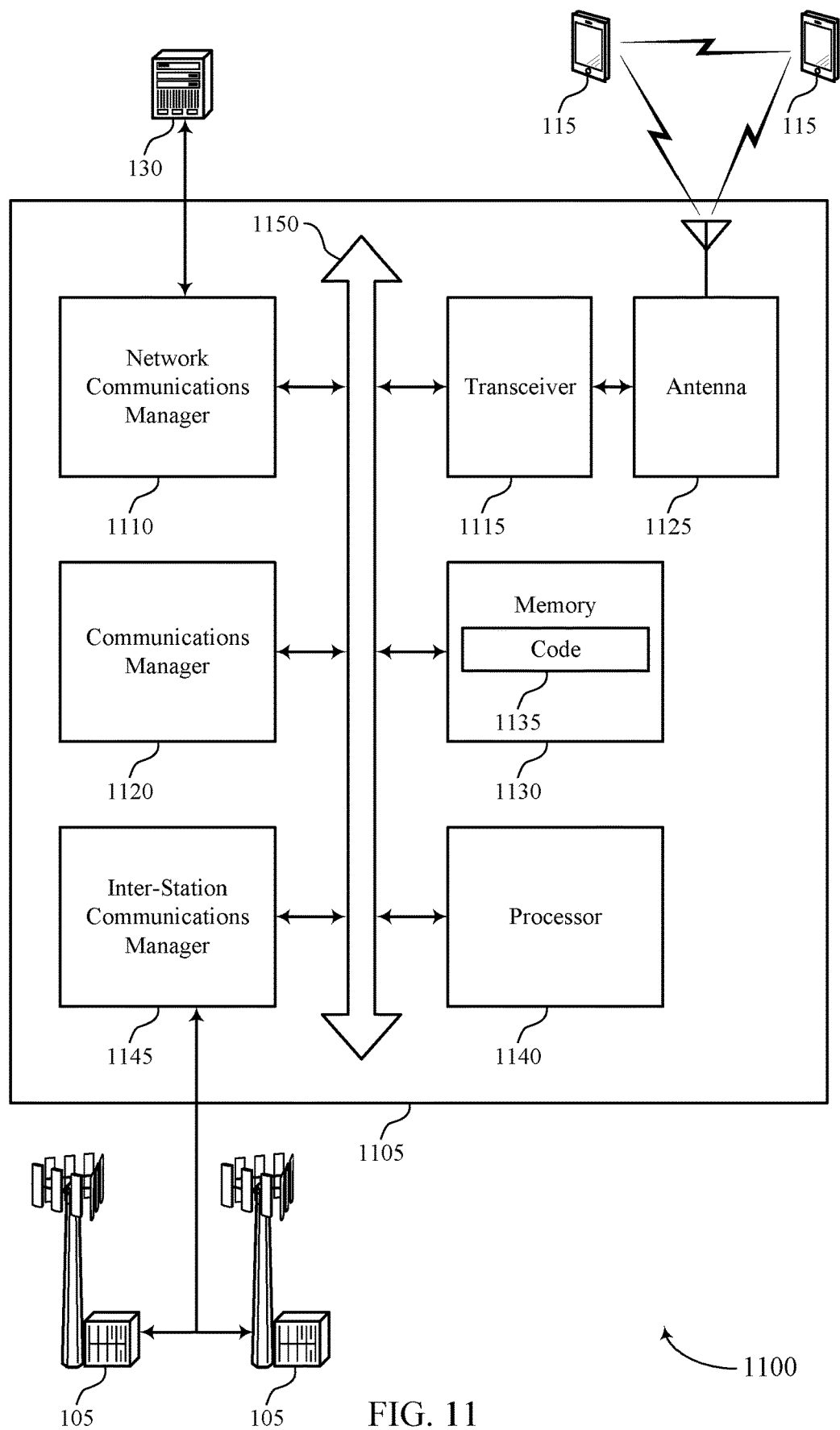
FIG. 11 shows a diagram of a system including a device that supports techniques for indicating coverage enhancement for random access procedures in wireless communications systems in accordance with aspects of the present disclosure.

FIG. 11 shows a diagram of a system 1100 including a device 1105 that supports techniques for indicating coverage enhancement for random access procedures in wireless communications systems in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for indicating coverage enhancement for random access procedures in wireless communications systems). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting, to a UE, a first random access message including an indication as to whether a coverage enhancement is associated with a second random access message, the indication based on a condition of a channel used to transmit the second random access message from the base station to the UE failing to satisfy a threshold. The communications manager 1120 may be configured as or otherwise support a means for transmitting, to the UE, the second random access message based on transmitting the indication.

By including or configuring the communications manager 1120 in accordance with examples as described herein, the device 1105 may support techniques for coverage enhancement in wireless communications systems, such that the device 1105 may experience a reduced processing, a reduced power consumption, an increased reliability of communications, or a more efficient resource utilization, among other benefits.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for indicating coverage enhancement for random access procedures in wireless communications systems as described herein, or the processor 1140 and the memory 1130 may be otherwise configured to perform or support such operations.

Figure 12:
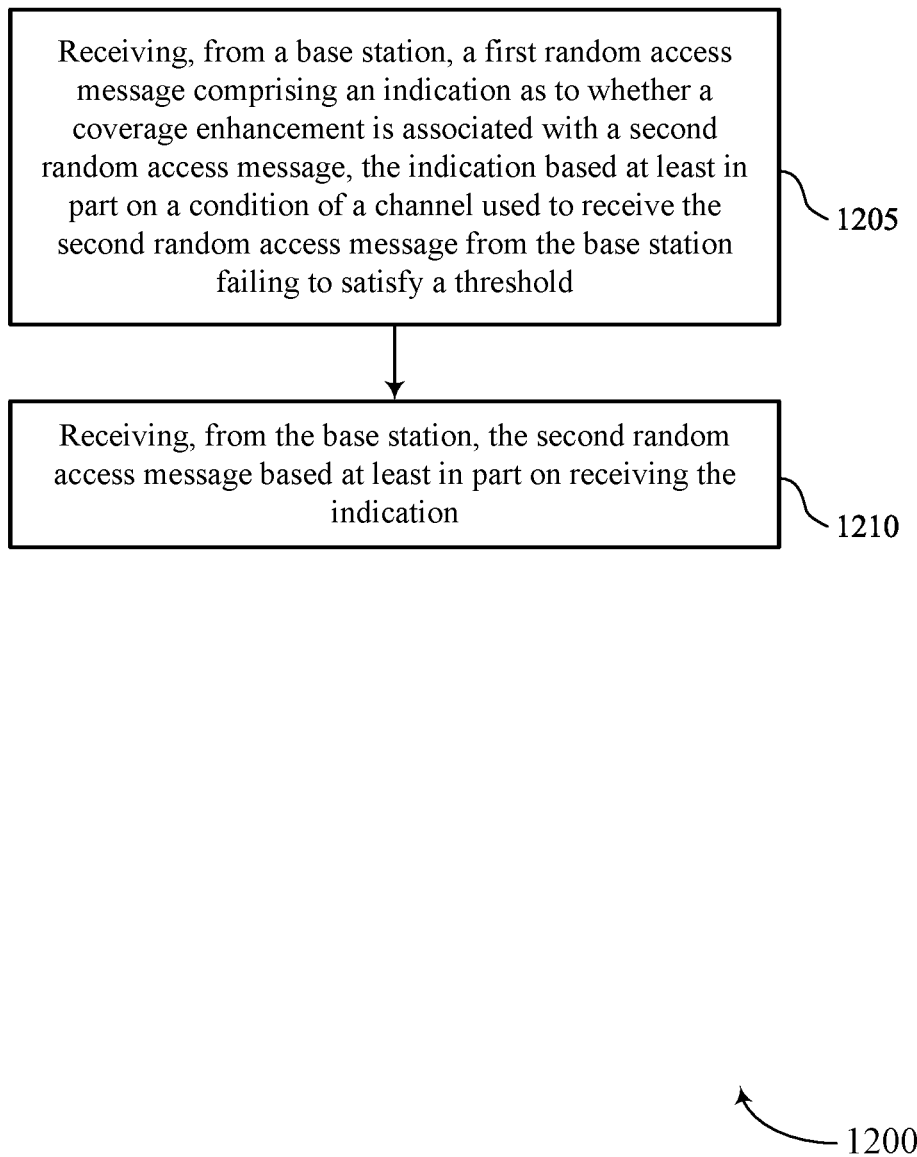
FIGS. 12 through 17 show flowcharts illustrating methods that support techniques for indicating coverage enhancement for random access procedures in wireless communications systems in accordance with aspects of the present disclosure.

FIG. 12 shows a flowchart illustrating a method 1200 that supports techniques for indicating coverage enhancement for random access procedures in wireless communications systems in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, a first random access message including an indication as to whether a coverage enhancement is associated with a second random access message, the indication based on a condition of a channel used to receive the second random access message from the base station failing to satisfy a threshold. The operations of 1205 may be performed in accordance with examples as disclosed herein. In some examples, aspects of the operations of 1205 may be performed by an indication receiver 625 as described with reference to FIG. 6.

At 1210, the method may include receiving, from the base station, the second random access message based on receiving the indication. The operations of 1210 may be performed in accordance with examples as disclosed herein. In some examples, aspects of the operations of 1210 may be performed by a message receiver 630 as described with reference to FIG. 6.

Figure 13:
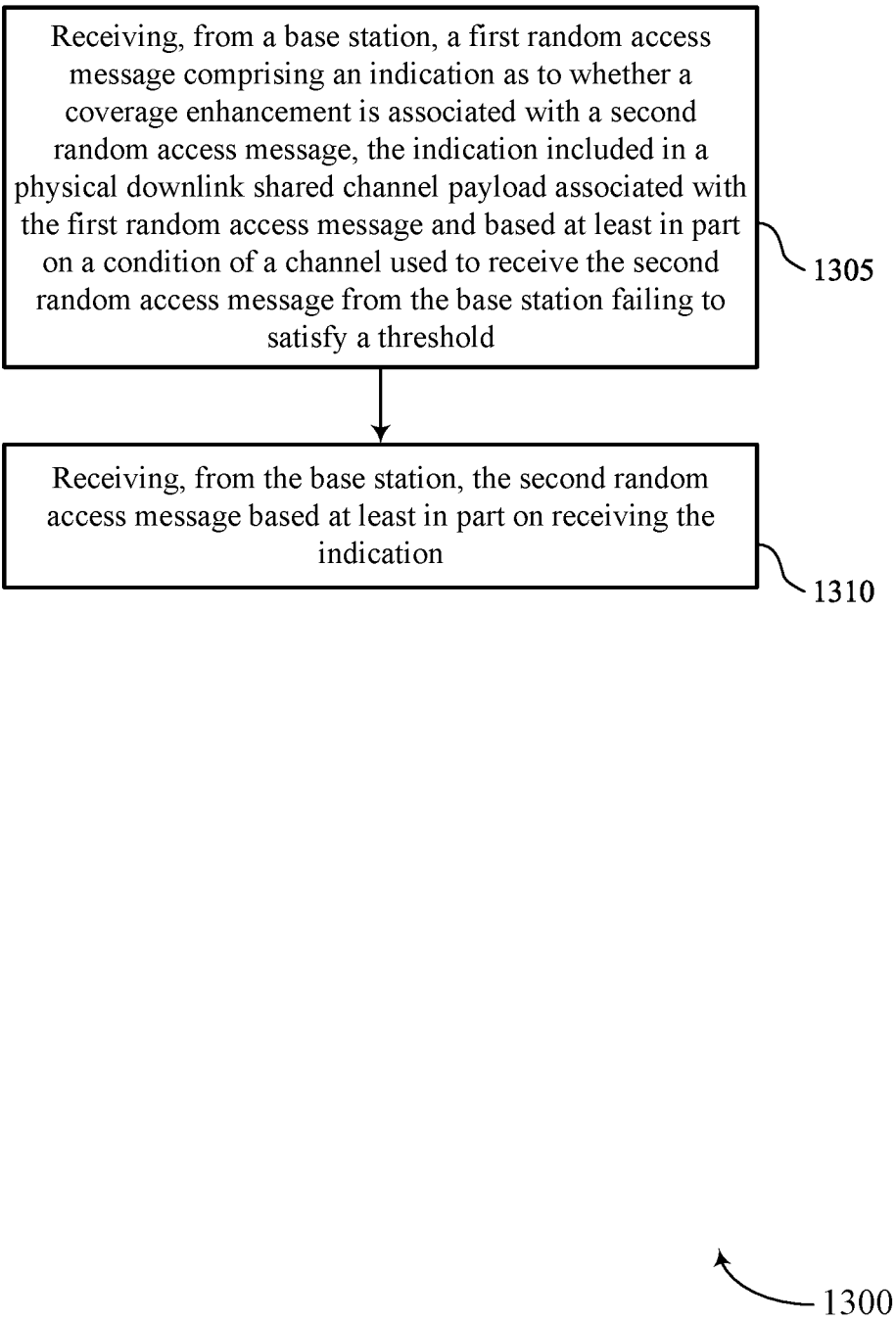

FIG. 13 shows a flowchart illustrating a method 1300 that supports techniques for indicating coverage enhancement for random access procedures in wireless communications systems in accordance with aspects of the present disclosure.

The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a first random access message including an indication as to whether a coverage enhancement is associated with a second random access message, the indication included in a PDSCH payload associated with the first random access message and based on a condition of a channel used to receive the second random access message from the base station failing to satisfy a threshold. The operations of 1305 may be performed in accordance with examples as disclosed herein. In some examples, aspects of the operations of 1305 may be performed by an indication receiver 625 as described with reference to FIG. 6.

At 1310, the method may include receiving, from the base station, the second random access message based on receiving the indication. The operations of 1310 may be performed in accordance with examples as disclosed herein. In some examples, aspects of the operations of 1310 may be performed by a message receiver 630 as described with reference to FIG. 6.

Figure 14:
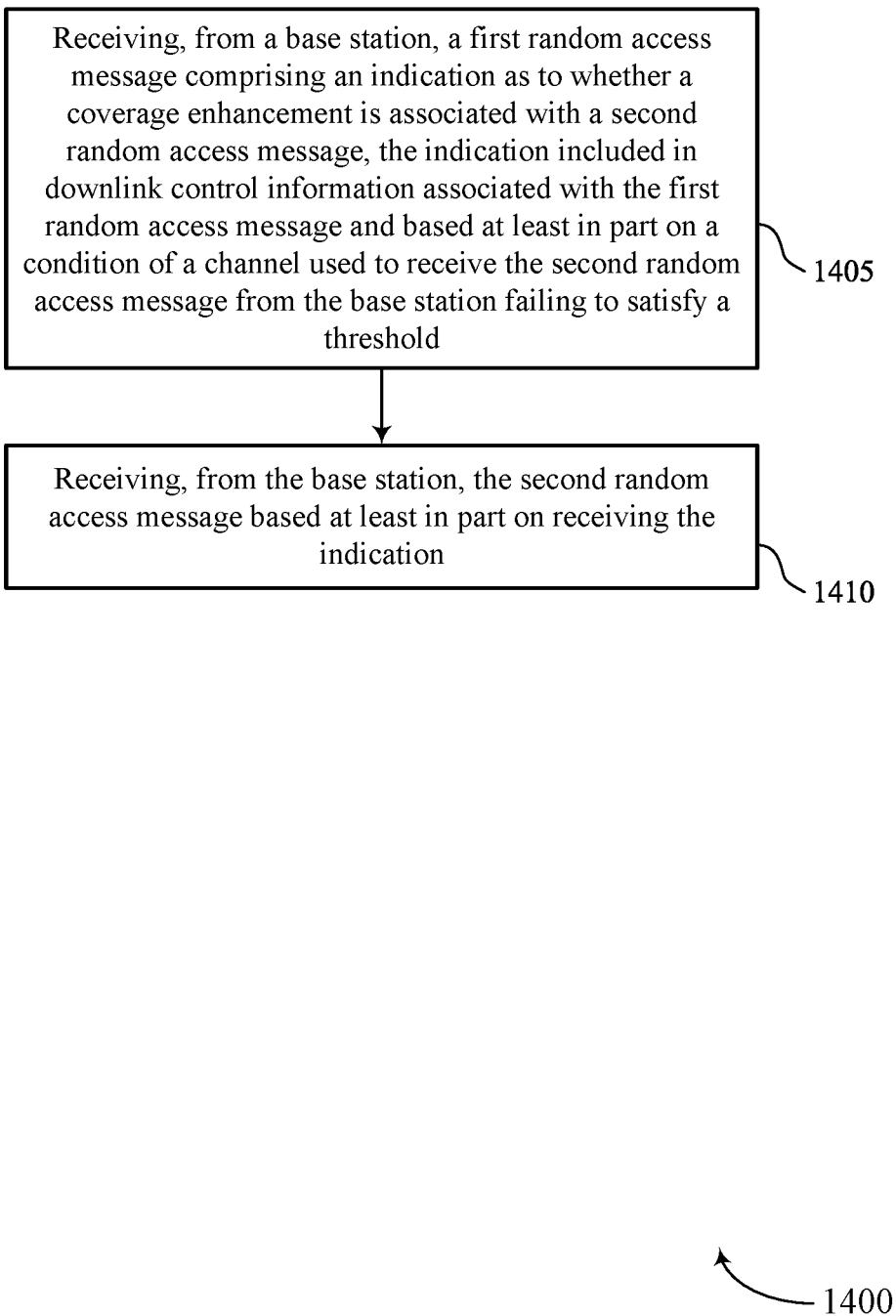

FIG. 14 shows a flowchart illustrating a method 1300 that supports techniques for indicating coverage enhancement for random access procedures in wireless communications systems in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a first random access message including an indication as to whether a coverage enhancement is associated with a second random access message, the indication included in a DCI associated with the first random access message and based on a condition of a channel used to receive the second random access message from the base station failing to satisfy a threshold. The operations of 1305 may be performed in accordance with examples as disclosed herein. In some examples, aspects of the operations of 1305 may be performed by an indication receiver 625 as described with reference to FIG. 6.

At 1310, the method may include receiving, from the base station, the second random access message based on receiving the indication. The operations of 1310 may be performed in accordance with examples as disclosed herein. In some examples, aspects of the operations of 1310 may be performed by a message receiver 630 as described with reference to FIG. 6.

Figure 15:
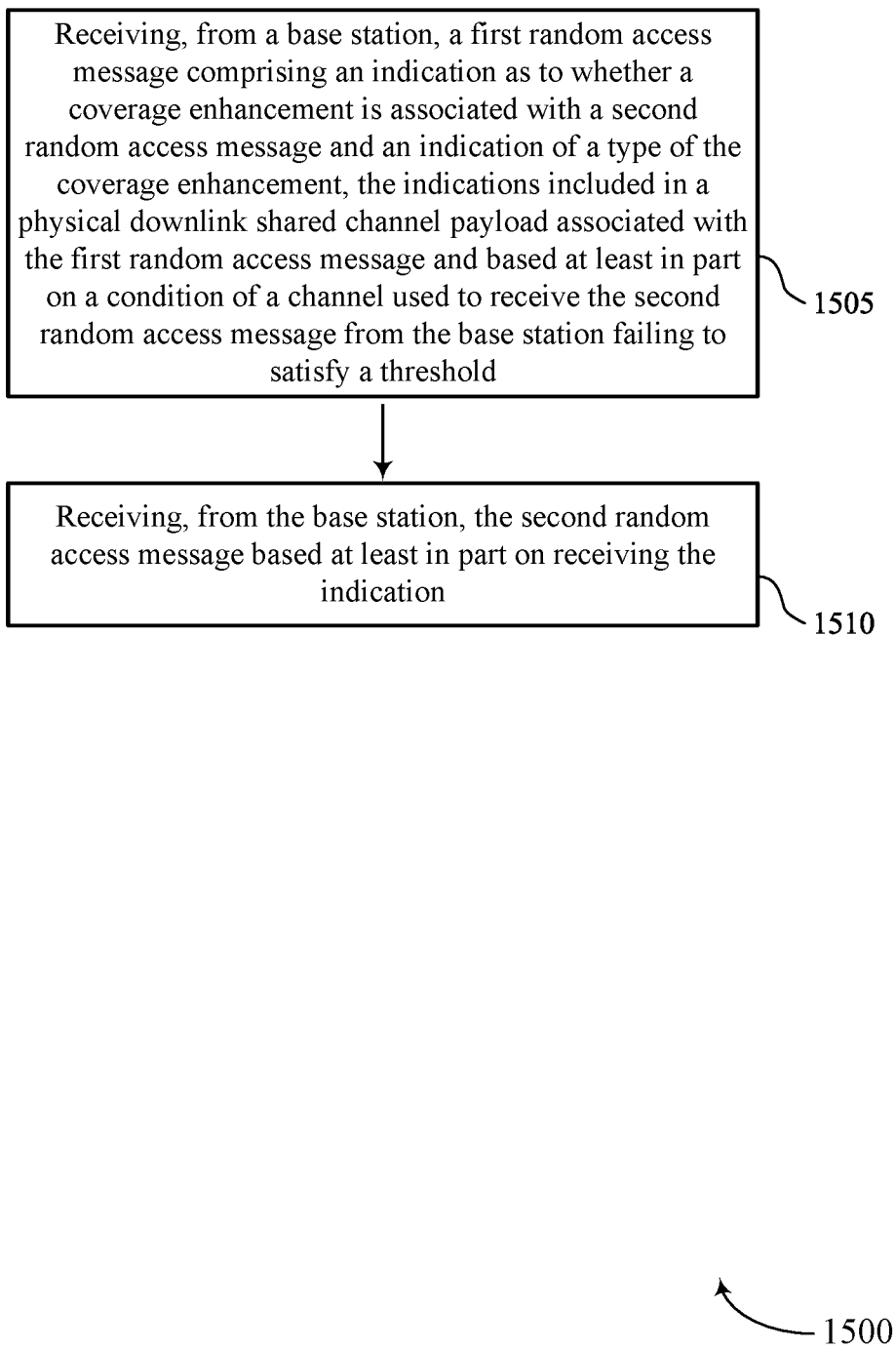

FIG. 15 shows a flowchart illustrating a method 1500 that supports techniques for indicating coverage enhancement for random access procedures in wireless communications systems in accordance with aspects of the present disclosure. The operations of the method 1500 may be implemented by a UE or its components as described herein. For example, the operations of the method 1500 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a first random access message including an indication as to whether a coverage enhancement is associated with a second random access message and an indication of a type of the coverage enhancement, the indications included in a PDSCH payload associated with the first random access message and based on a condition of a channel used to receive the second random access message from the base station failing to satisfy a threshold. The operations of 1505 may be performed in accordance with examples as disclosed herein. In some examples, aspects of the operations of 1505 may be performed by an indication receiver 625 as described with reference to FIG. 6.

At 1510, the method may include receiving, from the base station, the second random access message based on receiving the indication. The operations of 1510 may be performed in accordance with examples as disclosed herein. In some examples, aspects of the operations of 1510 may be performed by a message receiver 630 as described with reference to FIG. 6.

Figure 16:
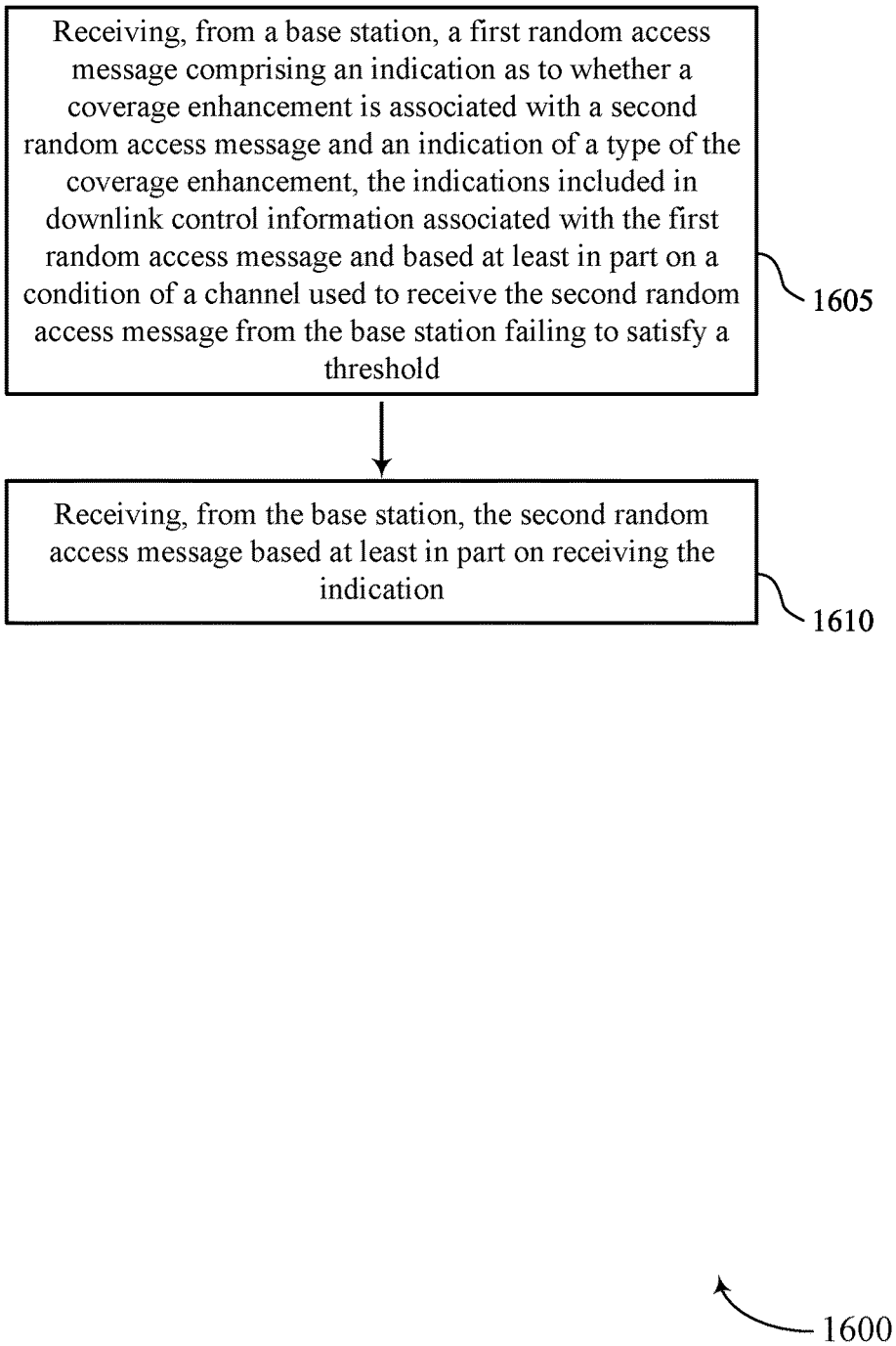

FIG. 16 shows a flowchart illustrating a method 1500 that supports techniques for indicating coverage enhancement for random access procedures in wireless communications systems in accordance with aspects of the present disclosure. The operations of the method 1500 may be implemented by a UE or its components as described herein. For example, the operations of the method 1500 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a first random access message including an indication as to whether a coverage enhancement is associated with a second random access message and an indication of a type of the coverage enhancement, the indications included in DCI associated with the first random access message and based on a condition of a channel used to receive the second random access message from the base station failing to satisfy a threshold. The operations of 1505 may be performed in accordance with examples as disclosed herein. In some examples, aspects of the operations of 1505 may be performed by an indication receiver 625 as described with reference to FIG. 6.

At 1510, the method may include receiving, from the base station, the second random access message based on receiving the indication. The operations of 1510 may be performed in accordance with examples as disclosed herein. In some examples, aspects of the operations of 1510 may be performed by a message receiver 630 as described with reference to FIG. 6.

Figure 17:
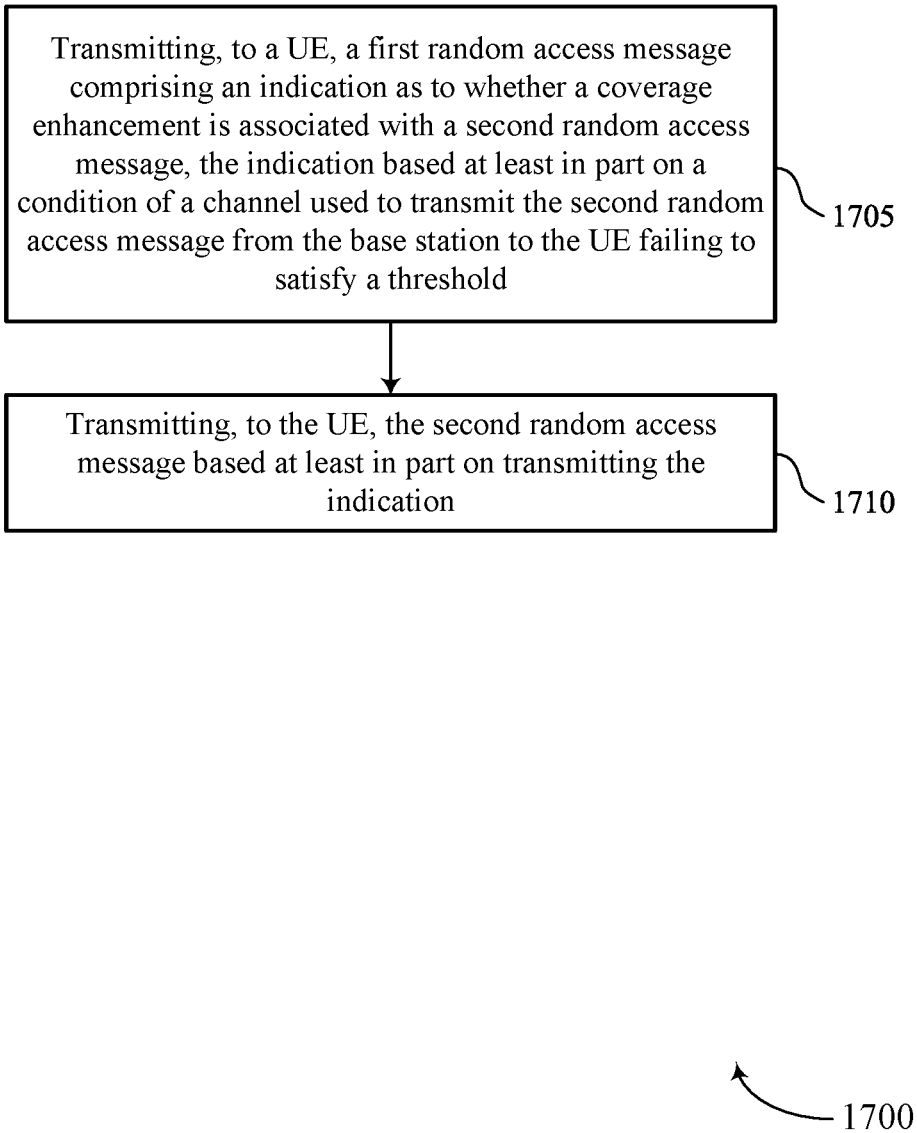

FIG. 17 shows a flowchart illustrating a method 1700 that supports techniques for indicating coverage enhancement for random access procedures in wireless communications systems in accordance with aspects of the present disclosure. The operations of the method 1700 may be implemented by a base station or its components as described herein. For example, the operations of the method 1700 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, a first random access message including an indication as to whether a coverage enhancement is associated with a second random access message, the indication based on a condition of a channel used to transmit the second random access message from the base station to the UE failing to satisfy a threshold. The operations of 1705 may be performed in accordance with examples as disclosed herein. In some examples, aspects of the operations of 1705 may be performed by an indication transmitter 1025 as described with reference to FIG. 10.

At 1710, the method may include transmitting, to the UE, the second random access message based on transmitting the indication. The operations of 1710 may be performed in accordance with examples as disclosed herein. In some examples, aspects of the operations of 1710 may be performed by a message transmitter 1030 as described with reference to FIG. 10.

The following provides an overview of aspects of the present disclosure:

Aspect 1: A method for wireless communication at a UE, comprising: receiving, from a base station, a first random access message comprising an indication as to whether a coverage enhancement is associated with a second random access message, the indication based at least in part on a condition of a channel used to receive the second random access message from the base station failing to satisfy a threshold; receiving, from the base station, the second random access message based at least in part on receiving the indication.

Aspect 2: The method of aspect 1, wherein receiving the first random access message comprises: receiving an indication of whether the coverage enhancement is associated with the second random access message in a physical downlink shared channel payload associated with the first random access message.

Aspect 3: The method of any of aspects 1 through 2, wherein receiving the first random access message comprises: receiving an indication of whether the coverage enhancement is associated with the second random access message in downlink control information associated with the first random access message.

Aspect 4: The method of any of aspects 1 through 3, wherein receiving the first random access message comprises: receiving the first random access message using a temporary cell radio network temporary identifier, wherein the first random access message implicitly indicates whether the coverage enhancement is associated with the second random access message based at least in part on the temporary cell radio network temporary identifier.

Aspect 5: The method of any of aspects 1 through 4, wherein receiving the first random access message comprises: receiving an indication comprising one bit configured for indicating whether the coverage enhancement is associated with a physical downlink control channel payload and a physical downlink shared channel payload associated with the second random access message, wherein the first random access message comprises the indication.

Aspect 6: The method of any of aspects 1 through 4, wherein receiving the first random access message comprises: receiving an indication comprising at least two bits configured for independently indicating whether the coverage enhancement is associated with a physical downlink control channel payload or a physical downlink shared channel payload or both associated with the second random access message, wherein the first random access message comprises the indication.

Aspect 7: The method of any of aspects 1 through 6, wherein receiving the first random access message comprises: receiving an indication of a type of the coverage enhancement in a physical downlink shared channel payload associated with the first random access message, wherein the first random access message comprises the indication.

Aspect 8: The method of any of aspects 1 through 7, wherein receiving the first random access message comprises: receiving an indication of a type of the coverage enhancement in a downlink control information payload associated with the first random access message, wherein the first random access message comprises the indication.

Aspect 9: The method of any of aspects 1 through 8, wherein receiving the first random access message comprises: receiving a downlink control information payload associated with the first random access message, wherein the first random access message implicitly indicates a type of the coverage enhancement associated with the second random access message based at least in part on a location of the downlink control information payload in the first random access message.

Aspect 10: The method of any of aspects 1 through 9, wherein receiving the first random access message comprises: receiving the first random access message using a temporary cell radio network temporary identifier, wherein the first random access message implicitly indicates a type of the coverage enhancement associated with the second random access message based at least in part on the temporary cell radio network temporary identifier.

Aspect 11: A method for wireless communication at a base station, comprising: transmitting, to a UE, a first random access message comprising an indication as to whether a coverage enhancement is associated with a second random access message, the indication based at least in part on a condition of a channel used to transmit the second random access message from the base station to the UE failing to satisfy a threshold; and transmitting, to the UE, the second random access message based at least in part on transmitting the indication.

Aspect 12: The method of aspect 11, wherein transmitting the first random access message comprises: transmitting an indication of whether the coverage enhancement is associated with the second random access message in a physical downlink shared channel payload associated with the first random access message.

Aspect 13: The method of any of aspects 11 through 12, wherein transmitting the first random access message comprises: transmitting an indication of whether the coverage enhancement is associated with the second random access message in downlink control information associated with the first random access message.

Aspect 14: The method of any of aspects 11 through 13, wherein transmitting the first random access message comprises: transmitting the first random access message using a temporary cell radio network temporary identifier, wherein the first random access message implicitly indicates whether the coverage enhancement is associated with the second random access message based at least in part on the temporary cell radio network temporary identifier.

Aspect 15: The method of any of aspects 11 through 14, wherein transmitting the first random access message comprises: transmitting an indication comprising one bit configured for indicating whether the coverage enhancement is associated with a physical downlink control channel payload and a physical downlink shared channel payload associated with the second random access message, wherein the first random access message comprises the indication.

Aspect 16: The method of any of aspects 11 through 14, wherein transmitting the first random access message comprises: transmitting an indication comprising at least two bits configured for independently indicating whether the coverage enhancement is associated with a physical downlink control channel payload or a physical downlink shared channel payload or both associated with the second random access message, wherein the first random access message comprises the indication.

Aspect 17: The method of any of aspects 11 through 16, further comprising: receiving, from the UE, a random access preamble, wherein transmitting the first random access message is in response to receiving the random access preamble.

Aspect 18: The method of aspect 17, further comprising: determining a channel characteristic associated with the channel between the base station and the UE based at least in part on receiving the random access preamble, wherein transmitting the first random access message is based at least in part on the channel characteristic.

Aspect 19: The method of aspect 18, wherein the channel characteristic comprises one or more of a reference signal received power or a signal-to-interference-plus-noise-ratio.

Aspect 20: The method of any of aspects 17 through 19, wherein receiving the random access preamble comprises: receiving, from the UE, a random access preamble requesting the coverage enhancement associated with the second random access message, wherein transmitting the first random access message is based at least in part on receiving the first random access message.

Aspect 21: The method of any of aspects 17 through 20, further comprising: determining a type of the UE based at least in part on receiving the random access preamble, wherein transmitting the first random access message is based at least in part on the type of the UE.

Aspect 22: The method of any of aspects 11 through 21, further comprising: determining to perform the coverage enhancement associated with the second random access message, wherein transmitting the first random access message is based at least in part on the determining; and transmitting the second random access message according to the coverage enhancement.

Aspect 23: The method of any of aspects 11 through 22, further comprising: determining that the base station is configured to use a first type of coverage enhancement associated with the second random access message, wherein transmitting the second random access message is based at least in part on the determining.

Aspect 24: The method of any of aspects 11 through 23, wherein transmitting the first random access message comprises: transmitting an indication of a type of the coverage enhancement in a physical downlink shared channel payload associated with the first random access message, wherein the first random access message comprises the indication.

Aspect 25: The method of any of aspects 11 through 24, wherein transmitting the first random access message comprises: transmitting an indication of a type of the coverage enhancement in a downlink control information payload associated with the first random access message, wherein the first random access message comprises the indication.

Aspect 26: The method of any of aspects 11 through 25, wherein transmitting the first random access message comprises: transmitting a downlink control information payload associated with the first random access message, wherein the first random access message implicitly indicates a type of the coverage enhancement associated with the second random access message based at least in part on a location of the downlink control information payload in the first random access message.

Aspect 27: The method of any of aspects 11 through 26, wherein transmitting the first random access message comprises: transmitting the first random access message using a temporary cell radio network temporary identifier, wherein the first random access message implicitly indicates a type of the coverage enhancement associated with the second random access message based at least in part on the temporary cell radio network temporary identifier.

Aspect 28: The method of any of aspects 11 through 27, further comprising: determining a first type of the coverage enhancement associated with the second random access message, wherein transmitting the first random access message comprises transmitting an indication of the first type; receiving, from the UE, a third random access message based at least in part on transmitting the first random access message; and determining a second type of the coverage enhancement associated with the second random access message based at least in part on transmitting the first random access message and receiving the fifth random access message, wherein transmitting the second random access message is based at least in part on determining the second type.

Aspect 29: An apparatus for wireless communication at a UE, comprising a processor; memory coupled with the processor; and instructions stored in the memory and executable by the processor to cause the apparatus to perform a method of any of aspects 1 through 10.

Aspect 30: An apparatus for wireless communication at a UE, comprising at least one means for performing a method of any of aspects 1 through 10.

Aspect 31: A non-transitory computer-readable medium storing code for wireless communication at a UE, the code comprising instructions executable by a processor to perform a method of any of aspects 1 through 10.

Aspect 32: An apparatus for wireless communication at a base station, comprising a processor; memory coupled with the processor; and instructions stored in the memory and executable by the processor to cause the apparatus to perform a method of any of aspects 11 through 28.

Aspect 33: An apparatus for wireless communication at a base station, comprising at least one means for performing a method of any of aspects 11 through 28.

Aspect 34: A non-transitory computer-readable medium storing code for wireless communication at a base station, the code comprising instructions executable by a processor to perform a method of any of aspects 11 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving, from an access network entity, a first random access message comprising an indication as to whether a coverage enhancement is associated with a second random access message, the indication based at least in part on a condition of a channel used to receive the second random access message from the access network entity failing to satisfy a threshold, the first random access message received using a temporary cell radio network temporary identifier, wherein the first random access message implicitly indicates whether the coverage enhancement is associated with the second random access message based at least in part on the temporary cell radio network temporary identifier;

receiving, from the access network entity, the second random access message based at least in part on receiving the indication.

2. The method of claim 1, wherein receiving the first random access message comprises:
receiving an indication of a type of coverage enhancement associated with the second random access message in a physical downlink shared channel payload associated with the first random access message.

3. The method of claim 1, wherein receiving the first random access message comprises:
receiving an indication of a type of coverage enhancement associated with the second random access message in downlink control information associated with the first random access message.

4. The method of claim 1, wherein receiving the first random access message comprises:
receiving an indication comprising one bit configured for indicating whether the coverage enhancement is associated with a physical downlink control channel payload and a physical downlink shared channel payload associated with the second random access message, wherein the first random access message comprises the indication.

5. The method of claim 1, wherein receiving the first random access message comprises:
receiving an indication comprising at least two bits configured for independently indicating whether the coverage enhancement is associated with a physical downlink control channel payload or a physical downlink shared channel payload or both associated with the second random access message, wherein the first random access message comprises the indication.

6. The method of claim 1, wherein receiving the first random access message comprises:
receiving an indication of a type of the coverage enhancement in a physical downlink shared channel payload associated with the first random access message, wherein the first random access message comprises the indication.

7. The method of claim 1, wherein receiving the first random access message comprises:
receiving an indication of a type of the coverage enhancement in a downlink control information payload associated with the first random access message, wherein the first random access message comprises the indication.

8. The method of claim 1, wherein receiving the first random access message comprises:
receiving a downlink control information payload associated with the first random access message, wherein the first random access message implicitly indicates a type of the coverage enhancement associated with the second random access message based at least in part on a location of the downlink control information payload in the first random access message.

9. The method of claim 1, wherein receiving the first random access message comprises:
receiving the first random access message using the temporary cell radio network temporary identifier, wherein the first random access message implicitly indicates a type of the coverage enhancement associated with the second random access message based at least in part on the temporary cell radio network temporary identifier.

10. A method for wireless communication at an access network entity, comprising:
transmitting, to a user equipment (UE), a first random access message comprising an indication as to whether a coverage enhancement is associated with a second random access message, the indication based at least in part on a condition of a channel used to transmit the second random access message from the access network entity to the UE failing to satisfy a threshold, the first random access message transmitted using a temporary cell radio network temporary identifier, wherein the first random access message implicitly indicates whether the coverage enhancement is associated with the second random access message based at least in part on the temporary cell radio network temporary identifier; and transmitting, to the UE, the second random access message based at least in part on transmitting the indication.

11. The method of claim 10, wherein transmitting the first random access message comprises:
transmitting an indication of a type of coverage enhancement associated with the second random access message in a physical downlink shared channel payload associated with the first random access message.

12. The method of claim 10, wherein transmitting the first random access message comprises:
transmitting an indication of a type of coverage enhancement associated with the second random access message in downlink control information associated with the first random access message.

13. The method of claim 10, wherein transmitting the first random access message comprises:
transmitting an indication comprising one bit configured for indicating whether the coverage enhancement is associated with a physical downlink control channel payload and a physical downlink shared channel payload associated with the second random access message, wherein the first random access message comprises the indication.

14. The method of claim 10, wherein transmitting the first random access message comprises:
transmitting an indication comprising at least two bits configured for independently indicating whether the coverage enhancement is associated with a physical downlink control channel payload or a physical downlink shared channel payload or both associated with the second random access message, wherein the first random access message comprises the indication.

15. The method of claim 10, further comprising:
receiving, from the UE, a random access preamble, wherein transmitting the first random access message is in response to receiving the random access preamble.

16. The method of claim 15, further comprising:
determining a channel characteristic associated with the channel between the access network entity and the UE based at least in part on receiving the random access preamble, wherein transmitting the first random access message is based at least in part on the channel characteristic.

17. The method of claim 16, wherein the channel characteristic comprises one or more of a reference signal received power or a signal-to-interference-plus-noise-ratio.

18. The method of claim 15, wherein receiving the random access preamble comprises:
receiving, from the UE, the random access preamble, the random access preamble requesting the coverage enhancement associated with the second random access message, wherein transmitting the first random access message is based at least in part on receiving the first random access preamble.

19. The method of claim 15, further comprising:
determining a type of the UE based at least in part on receiving the random access preamble, wherein transmitting the first random access message is based at least in part on the type of the UE.

20. The method of claim 10, further comprising:
determining to perform the coverage enhancement associated with the second random access message, wherein transmitting the first random access message is based at least in part on the determining; and
transmitting the second random access message according to the coverage enhancement.

21. The method of claim 10, further comprising:
determining that the access network entity is configured to use a first type of coverage enhancement associated with the second random access message, wherein transmitting the second random access message is based at least in part on the determining.

22. The method of claim 10, wherein transmitting the first random access message comprises:
transmitting an indication of a type of the coverage enhancement in a physical downlink shared channel payload associated with the first random access message, wherein the first random access message comprises the indication.

23. The method of claim 10, wherein transmitting the first random access message comprises:
transmitting an indication of a type of the coverage enhancement in a downlink control information payload associated with the first random access message, wherein the first random access message comprises the indication.

24. The method of claim 10, wherein transmitting the first random access message comprises:
transmitting a downlink control information payload associated with the first random access message, wherein the first random access message implicitly indicates a type of the coverage enhancement associated with the second random access message based at least in part on a location of the downlink control information payload in the first random access message.

25. The method of claim 10, wherein transmitting the first random access message comprises:
transmitting the first random access message using the temporary cell radio network temporary identifier, wherein the first random access message implicitly indicates a type of the coverage enhancement associated with the second random access message based at least in part on the temporary cell radio network temporary identifier.

26. The method of claim 10, further comprising:
determining a first type of the coverage enhancement associated with the second random access message, wherein transmitting the first random access message comprises transmitting an indication of the first type;
receiving, from the UE, a third random access message based at least in part on transmitting the first random access message; and
determining a second type of the coverage enhancement associated with the second random access message based at least in part on transmitting the first random access message and receiving the third random access message, wherein transmitting the second random access message is based at least in part on determining the second type.

27. An apparatus for wireless communication at a user equipment (UE), comprising:
a processor;
memory coupled with the processor; and
instructions stored in the memory and executable by the processor to cause the apparatus to:
receive, from an access network entity, a first random access message comprising an indication as to whether a coverage enhancement is associated with a second random access message, the indication based at least in part on a condition of a channel used to receive the second random access message from the access network entity failing to satisfy a threshold, the first random access message received using a temporary cell radio network temporary identifier, wherein the first random access message implicitly indicates whether the coverage enhancement is associated with the second random access message based at least in part on the temporary cell radio network temporary identifier;
receive, from the access network entity, the second random access message based at least in part on receiving the indication.

28. An apparatus for wireless communication at an access network entity, comprising:
a processor;
memory coupled with the processor; and
instructions stored in the memory and executable by the processor to cause the apparatus to:
transmit, to a user equipment (UE), a first random access message comprising an indication as to whether a coverage enhancement is associated with a second random access message, the indication based at least in part on a condition of a channel used to transmit the second random access message from the access network entity to the UE failing to satisfy a threshold, the first random access message transmitted using a temporary cell radio network temporary identifier, wherein the first random access message implicitly indicates whether the coverage enhancement is associated with the second random access message based at least in part on the temporary cell radio network temporary identifier; and
transmit, to the UE, the second random access message based at least in part on transmitting the indication.

* * * * *